(12) United States Patent
Oh et al.

(10) Patent No.: US 12,327,312 B2
(45) Date of Patent: Jun. 10, 2025

(54) METHOD AND DEVICE FOR DISPLAYING 3D DRAWING

(71) Applicant: SAMSUNG E&A CO., LTD., Seoul (KR)

(72) Inventors: Dong Yong Oh, Seoul (KR); Kabpyo Kyung, Seoul (KR); Mijeong Kim, Seoul (KR); Seunghee Seo, Seoul (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/698,879

(22) PCT Filed: Oct. 25, 2022

(86) PCT No.: PCT/KR2022/016301
§ 371 (c)(1),
(2) Date: Apr. 5, 2024

(87) PCT Pub. No.: WO2023/075340
PCT Pub. Date: May 4, 2023

(65) Prior Publication Data
US 2024/0331290 A1  Oct. 3, 2024

(30) Foreign Application Priority Data
Oct. 26, 2021 (KR) .................. 10-2021-0143739

(51) Int. Cl.
*G06T 17/10* (2006.01)
*G06F 18/2413* (2023.01)
*G06T 7/60* (2017.01)

(52) U.S. Cl.
CPC ........ *G06T 17/10* (2013.01); *G06F 18/24147* (2023.01); *G06T 7/60* (2013.01)

(58) Field of Classification Search
CPC ........... G06T 17/10; G06T 7/60; G06T 17/20; G06T 19/00; G06T 19/20;
(Continued)

(56) References Cited

U.S. PATENT DOCUMENTS 6,061,067 A * 5/2000 Silva .................. G06T 13/20
345/619
6,768,486 B1 * 7/2004 Szabo ................. G06T 17/20
345/643
(Continued)

FOREIGN PATENT DOCUMENTS

| | | |
|---|---|---|
| JP | H09-73472 | 3/1997 |
| JP | 3825994 | 9/2006 |

(Continued)

OTHER PUBLICATIONS

KIPO, A PCT Search Report & Written Opinion of Application No. PCT/KR2022/016301, dated Feb. 10, 2023, total 11 pages.

*Primary Examiner* — Motilewa Good-Johnson
(74) *Attorney, Agent, or Firm* — LEX IP MEISTER, PLLC

(57) ABSTRACT

Provided is a method for displaying a three-dimensional (3D) drawing, the method including: receiving, by an input unit, selection of one 3D model object in the 3D drawing including the plurality of 3D model objects; calculating, by a control unit, a dimension of the selected 3D model object based on 3D model data corresponding to the selected 3D model object; and determining, by the control unit, a position where the dimension of the selected 3D model object is displayed, wherein the 3D model data includes object type information of the 3D model object that corresponds to each 3D model object.

24 Claims, 27 Drawing Sheets

(58) Field of Classification Search
CPC ........... G06F 18/24147; G06F 2111/06; G06F 30/18; G06F 2111/18; G06F 2111/20; G06F 30/17

See application file for complete search history.

(56) References Cited

U.S. PATENT DOCUMENTS

| | | | |
|---|---|---|---|
| 6,906,712 B2* | 6/2005 | Lee | G06T 19/20 345/420 |
| 7,538,764 B2* | 5/2009 | Salomie | G06T 17/20 380/232 |
| 9,110,560 B1 | 8/2015 | Senesac | |
| 9,880,694 B2 | 1/2018 | Senesac | |
| 10,488,189 B2* | 11/2019 | Delfino | G06F 30/00 |
| 10,635,734 B2 | 4/2020 | Floyd et al. | |
| 10,832,182 B2 | 11/2020 | Floyd et al. | |
| 10,997,782 B2 | 5/2021 | Edwards et al. | |
| 11,010,531 B2 | 5/2021 | Cho | |
| 12,033,258 B1* | 7/2024 | Sohail | G10L 21/10 |
| 2006/0082571 A1* | 4/2006 | McDaniel | G06T 19/20 345/419 |
| 2011/0087513 A1 | 4/2011 | Floyd et al. | |
| 2014/0207420 A1* | 7/2014 | Edwards | G06T 19/00 703/1 |
| 2015/0100571 A1 | 4/2015 | Floyd et al. | |
| 2015/0120251 A1 | 4/2015 | Kim | |
| 2015/0332508 A1* | 11/2015 | Jovanovic | G06F 3/04815 345/427 |
| 2015/0332511 A1* | 11/2015 | Jovanovic | G06F 3/04815 345/427 |
| 2016/0188159 A1* | 6/2016 | Dayde | G06T 15/08 715/782 |
| 2017/0178400 A1* | 6/2017 | Boulkenafed | G06T 19/20 |
| 2017/0180756 A1* | 6/2017 | Tuffreau | H04N 13/161 |
| 2020/0210638 A1 | 7/2020 | Cho | |
| 2020/0398495 A1* | 12/2020 | Roca | G06N 3/08 |
| 2020/0410774 A1 | 12/2020 | Mimori et al. | |
| 2022/0129138 A1* | 4/2022 | List | G06F 3/0482 |
| 2022/0139043 A1* | 5/2022 | Jovanovic | G06T 19/20 345/419 |
| 2022/0139094 A1* | 5/2022 | Yoshimi | G06T 7/174 382/173 |
| 2022/0398003 A1* | 12/2022 | McKee | G06Q 10/087 |
| 2023/0084639 A1* | 3/2023 | Kettay | G06F 30/12 33/494 |
| 2024/0004542 A1* | 1/2024 | Krishnamurthy | G06F 3/017 |

FOREIGN PATENT DOCUMENTS

| | | | |
|---|---|---|---|
| JP | 2016-058080 | 4/2016 | |
| JP | 2016-122442 | 7/2016 | |
| JP | 2016-143141 | 8/2016 | |
| JP | 6493585 | 4/2019 | |
| JP | 6544407 | 7/2019 | |
| JP | 2019-159667 | 9/2019 | |
| KR | 10-1388749 | 4/2014 | |
| KR | 2015-0099790 | 9/2015 | |
| KR | 10-2046147 | 11/2019 | |
| KR | 2020-0097804 | 8/2020 | |
| WO | WO-2011053328 A1 * | 5/2011 | G06T 11/00 |

* cited by examiner

FIG. 6

| | 1 PIPE | 2 CABLE TRAY | 3 ARCHITECTURAL STRUCTURE | 4 ARCHITECTURAL STRUCTURE | 5 ARCHITECTURAL STRUCTURE |
|---|---|---|---|---|---|
| | | | | EQUIPMENT | |
| | Cylinder<br>: 4 Sides<br>: Start, Center, End<br>(Routing Direction) | Bounding Box<br>: 2 Sides<br>: Center<br>(LONGEST IN X, Y) | Bounding Box<br>: Top, Bottom<br>: Center<br>(LONGEST IN X, Y) | Bounding Box<br>: Top<br>: Center | Bounding Box<br>: Bottom<br>: Upper, Below |

(second row: EQUIPMENT column) Bounding Box : 4 Sides : Center

| | 6 CABLE TRAY | 7 CABLE TRAY | 8 ARCHITECTURAL GRID |
|---|---|---|---|
| | Bounding Box<br>: X (East ↔ West)<br>: Center | Bounding Box<br>: Y (North ↔ South)<br>: Center | Bounding Box<br>: Z (Up ↔ Down)<br>: Center |

(last column row: ARCHITECTURAL GRID) Bounding Box : 2 Sides (Shortest) + Box Center : Start, Center, End

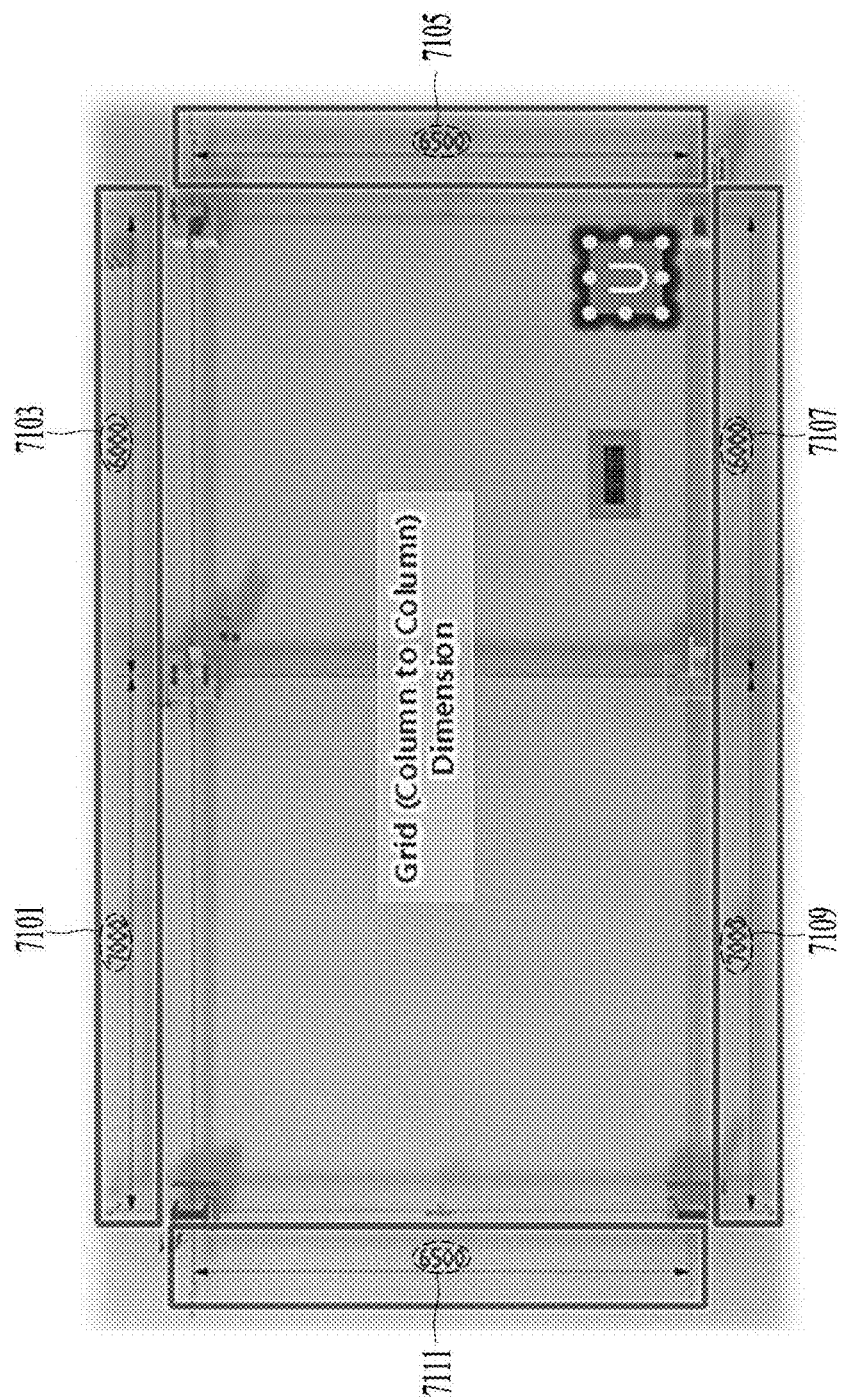

METHOD AND DEVICE FOR DISPLAYING 3D DRAWING

TECHNICAL FIELD

The disclosure relates to a method and a device for a three-dimensional (3D) drawing.

BACKGROUND ART

Conventionally, a distance between coordinates may be calculated by manually selecting two points where coordinate values are stored when trying to measure a distance between three-dimensional (3D) objects by using a 3D viewer program. However, when using the conventional 3D viewer program, it is difficult to select an accurate point for the measurement, and it is impossible to know the distance if the coordinate value of the selected point is not pre-stored. In addition, even when it is possible to calculate the distance between the coordinates, it is impossible for a user to easily identify a calculated value based on a position where the calculated value is displayed. Therefore, conventionally, it is difficult to use a distance value measured using the 3D viewer program in construction, or the like, and a two-dimensional (2D) drawing may be used in parallel when checking the distance value between the 3D objects.

DISCLOSURE

Technical Problem

The disclosure attempts to indicate accurate dimensions and distances in a three-dimensional (3D) modeling space.
The disclosure also attempts to improve visibility of a 3D drawing.

Technical Solution

According to an embodiment, provided is a method for a three-dimensional (3D) drawing, the method including: receiving, by an input unit, selection of one 3D model object in the 3D drawing including the plurality of 3D model objects; calculating, by a control unit, a dimension of the selected 3D model object based on 3D model data corresponding to the selected 3D model object; and determining, by the control unit, a position where the dimension of the selected 3D model object is displayed, wherein the 3D model data includes object type information of the 3D model object that corresponds to each 3D model object.

The method may further include: receiving, by the input unit, selection of two or more 3D model objects in the 3D drawing; grouping, by the control unit, each two of 3D model objects disposed to be adjacent to each other among the selected 3D model objects into one group; classifying, by the control unit, a group relationship between the grouped 3D model objects; and calculating, by the control unit, a distance between the selected 3D model objects based on the 3D model data, based on the group relationship.

The method may further include: determining, by the control unit, a type of the selected 3D model object based on the object type information after receiving, by the input unit, the selection of at least one 3D model object, the type of the 3D model object including a point object and a line object; collecting, by the control unit, the point type and point coordinate information of the 3D model object based on the corresponding 3D model data when the 3D model object is the point object; and collecting, by the control unit, line direction information of the 3D model object based on the corresponding 3D model data when the 3D model object is the line object.

The 3D model data may include connection relationship information between the 3D model objects in the 3D drawing, the classifying of the group relationship between the grouped 3D model objects may include classifying, by the control unit, the group relationship between the grouped 3D model objects based on the connection relationship information between the 3D model objects in the 3D drawing, and the calculating of the distance between the selected 3D model objects may include: calculating, by the control unit, a distance difference between the line objects in a direction orthogonal to a line based on the line direction information when in the group relationship, all the 3D model objects grouped into the one group are the line objects; calculating, by the control unit, a distance difference between the point coordinate information and the line object in the direction orthogonal to the line when one of the 3D model objects grouped into the one group is the point object and the other is the line object; and calculating, by the control unit, at least one of an x axis distance, a y axis distance, a z axis distance, and a shortest distance between the respective point coordinate information when all the 3D model objects grouped into the one group are the point objects.

The determining, by the control unit, of the position where the dimension of the selected 3D model object is displayed may include determining, by the control unit, a position where at least one of the calculated dimension and distance is displayed based on a display position determination rule, and the display position determination rule may be based on at least one of a user viewpoint direction, the type of the 3D model object, and the group relationship between the grouped 3D model objects.

The determining, by the control unit, of the position where the at least one of the calculated dimension and distance is displayed based on the display position determination rule may include: displaying, by the control unit, the distance on a plane where a largest area is visible based on the user viewpoint direction relative to an z axis when all the 3D model objects grouped into the one group are vertical line objects parallel to the z axis; and displaying, by the control unit, the distance in the user viewpoint direction when all the 3D model objects grouped into the one group are horizontal line objects parallel to an x axis and a y axis.

The determining, by the control unit, of the position where the at least one of the calculated dimension and distance is displayed based on the display position determination rule may include generating, by the control unit, a reference plane that is orthogonal to the line object and passes through a point coordinate of the point object when one of the 3D model objects grouped into the one group is the point object and the other is the line object, and the display position determination rule may be based more on the reference plane and a line direction of the line object.

The determining, by the control unit, of the position where the at least one of the calculated dimension and distance is displayed based on the display position determination rule may include: determining, by the control unit, whether the respective 3D model objects have their axes matching each other based on the point coordinate information of each 3D model object when all the 3D model objects grouped into the one group are the point objects; generating, by the control unit, a reference graphic including at least one of a reference cube, a reference plane, and a reference line based on whether the axes match each other; and displaying, by the control unit, the calculated distance along with the generated reference graphic.

According to another embodiment, provided is a method for a three-dimensional (3D) drawing, the method including: receiving, by an input unit, selection of an arbitrary category in the 3D drawing including a plurality of 3D model objects; determining, by a control unit, the 3D model object disposed in the arbitrary category; grouping, by the control unit, each two of the 3D model objects disposed to be adjacent to each other among the 3D model objects into one group; classifying, by the control unit, a group relationship between the grouped 3D model objects; and calculating, by the control unit, a distance between the 3D model objects based on 3D model data including object type information of the 3D model object, based on the group relationship.

The determining, by the control unit, of the 3D model object disposed in the arbitrary category may include: determining, by the control unit, a type of the selected 3D model object based on the object type information, the type of the 3D model object including a point object and a line object; collecting, by the control unit, the point type and point coordinate information of the 3D model object based on the corresponding 3D model data when the 3D model object is the point object; determining, by the control unit, the 3D model object as being disposed in the arbitrary category when its x axis and y axis coordinate values in the point coordinate information are disposed in the arbitrary category; collecting, by the control unit, the start point, end point, and line direction information of the 3D model object based on the corresponding 3D model data when the 3D model object is the line object; and determining, by the control unit, the 3D model object as being disposed in the arbitrary category when coordinates of the start and end points of the line object are disposed in the arbitrary category.

The 3D model data may include connection relationship information between the 3D model objects in the 3D drawing, the classifying of the group relationship between the grouped 3D model objects may include classifying, by the control unit, the group relationship between the grouped 3D model objects based on the connection relationship information between the 3D model objects in the 3D drawing, and the calculating of the distance between the selected 3D model objects may include: calculating, by the control unit, a distance difference between the line objects in a direction orthogonal to a line based on the line direction information when in the group relationship, all the 3D model objects grouped into the one group are the line objects; calculating, by the control unit, a distance difference between the point coordinate information and the line object in the direction orthogonal to the line when one of the 3D model objects grouped into the one group is the point object and the other is the line object; and calculating, by the control unit, at least one of an x axis distance, a y axis distance, a z axis distance, and a shortest distance between the respective point coordinate information when all the 3D model objects grouped into the one group are the point objects.

The method may further include: collecting, by the control unit, the coordinate information where a point extension line of each 3D model object in an x axis direction or a y axis direction and an arbitrary category slope are orthogonal to each other based on the point coordinate information when the 3D model object is the point object; collecting, by the control unit, line information where the line object and the category slope are orthogonal to each other when the 3D model object is the line object; and displaying, by the control unit, the calculated distance between the 3D model objects in the collected coordinate information.

According to another embodiment, provided is an device for a three-dimensional (3D) drawing, the device including: an input unit receiving selection of one 3D model object in the 3D drawing including the plurality of 3D model objects; and a control unit calculating a dimension of the selected 3D model object based on 3D model data corresponding to the selected 3D model object, and determining a position where the dimension of the selected 3D model object is displayed, wherein the 3D model data includes object type information of the 3D model object that corresponds to each 3D model object.

The input unit may receive selection of two or more 3D model objects in the 3D drawing, and the control unit may group each two of 3D model objects disposed to be adjacent to each other among the selected 3D model objects into one group, classify a group relationship between the grouped 3D model objects, and calculate a distance between the selected 3D model objects based on the 3D model data, based on the group relationship.

The control unit may determine a type of the selected 3D model object based on the object type information after the input unit receives the selection of at least one 3D model object, the type of the 3D model object including a point object and a line object, collect the point type and point coordinate information of the 3D model object based on the corresponding 3D model data when the 3D model object is the point object, and collect line direction information of the 3D model object based on the corresponding 3D model data when the 3D model object is the line object.

The 3D model data may include connection relationship information between the 3D model objects in the 3D drawing, and the control unit may classify the group relationship between the grouped 3D model objects based on the connection relationship information between the 3D model objects in the 3D drawing, calculate a distance difference between the line objects in a direction orthogonal to a line based on the line direction information when in the group relationship, all the 3D model objects grouped into the one group are the line objects, calculate a distance difference between the point coordinate information and the line object in the direction orthogonal to the line when one of the 3D model objects grouped into the one group is the point object and the other is the line object, and calculate at least one of an x axis distance, a y axis distance, a z axis distance, and a shortest distance between the respective point coordinate information when all the 3D model objects grouped into the one group are the point objects.

The control unit may determine a position where at least one of the calculated dimension and distance is displayed based on a display position determination rule, and the display position determination rule may be based on at least one of a user viewpoint direction, the type of the 3D model object, and the group relationship between the grouped 3D model objects.

The control unit may display the distance on a plane where a largest area is visible based on the user viewpoint direction relative to an z axis when all the 3D model objects grouped into the one group are vertical line objects parallel to the z axis, and display the distance in the user viewpoint direction when all the 3D model objects grouped into the one group are horizontal line objects parallel to an x axis and a y axis.

The control unit may generate a reference plane that is orthogonal to the line object and passes through a point coordinate of the point object when one of the 3D model objects grouped into the one group is the point object and the other is the line object, and the display position determination rule may be based more on the reference plane and a line direction of the line object.

The control unit may determine whether the respective 3D model objects have their axes matching each other based on the point coordinate information of each 3D model object when all the 3D model objects grouped into the one group are the point objects, generate a reference graphic including at least one of a reference cube, a reference plane, and a reference line based on whether the axes match each other, and display the calculated distance along with the generated reference graphic.

According to another embodiment, provided is an device for a three-dimensional (3D) drawing, the device including: an input unit receiving selection of an arbitrary category in the 3D drawing including a plurality of 3D model objects; and a control unit determining the 3D model object disposed in the arbitrary category, grouping each two of the 3D model objects disposed to be adjacent to each other among the 3D model objects into one group, classifying a group relationship between the grouped 3D model objects, and calculating a distance between the 3D model objects based on 3D model data including object type information of the 3D model object based on the group relationship.

The control unit may determine a type of the selected 3D model object based on the object type information, the type of the 3D model object including a point object and a line object, collect the point type and point coordinate information of the 3D model object based on the corresponding 3D model data when the 3D model object is the point object based on the corresponding 3D model data when the 3D model object is the point object, determine the 3D model object as being disposed in the arbitrary category when its x axis and y axis coordinate values in the point coordinate information are disposed in the arbitrary category, collect the start point, end point, and line direction information of the 3D model object based on the corresponding 3D model data when the 3D model object is the line object, and determine the 3D model object as being disposed in the arbitrary category when coordinates of the start and end points of the line object are disposed in the arbitrary category.

The 3D model data may include connection relationship information between the 3D model objects in the 3D drawing, and the control unit may classify the group relationship between the grouped 3D model objects based on the connection relationship information between the 3D model objects in the 3D drawing, calculate a distance difference between the line objects in a direction orthogonal to a line based on the line direction information when in the group relationship, all the 3D model objects grouped into the one group are the line objects, calculate a distance difference between the point coordinate information and the line object in the direction orthogonal to the line when one of the 3D model objects grouped into the one group is the point object and the other is the line object, and calculate at least one of an x axis distance, a y axis distance, a z axis distance, and a shortest distance between the respective point coordinate information when all the 3D model objects grouped into the one group are the point objects.

The control unit may determine a position where the distance between the 3D model objects disposed in the arbitrary category is displayed, collect the coordinate information where a point extension line of each 3D model object in an x axis direction or a y axis direction and an arbitrary category slope are orthogonal to each other based on the point coordinate information when the 3D model object is the point object, collect line information where the line object and the category slope are orthogonal to each other when the 3D model object is the line object, and display the calculated distance in the collected coordinate information.

A program according to another embodiment may be stored in a recording medium to perform a method for a three-dimensional (3D) drawing.

A recording medium according to another embodiment may store a program performing a method for a three-dimensional (3D) drawing.

Advantageous Effects

According to an embodiment of the disclosure, it is possible to accurately calculate the distance between the 3D objects or the dimensions in the 3D object.

According to an embodiment of the disclosure, it is possible to improve the visibility of the 3D drawing.

DESCRIPTION OF THE DRAWINGS

FIG. 6 is a view showing a position where necessary information is displayed based on the type of the 3D model object.

FIGS. 7A and 7B are views each showing a position where a value pre-stored in a memory is displayed based on the type of the 3D model object.

MODE FOR INVENTION

Figure 1:
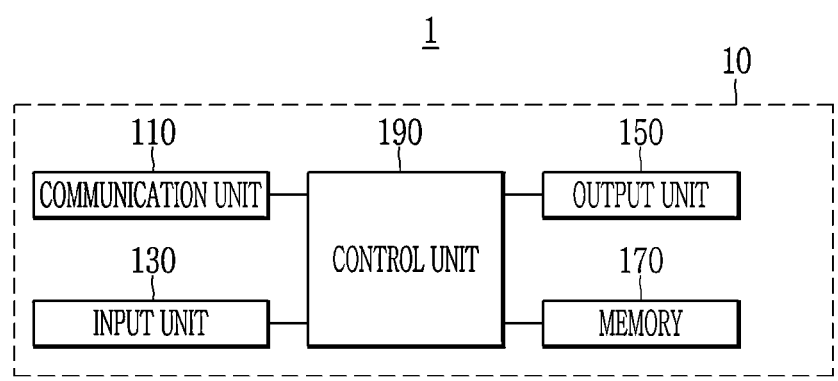
FIG. 1 is a configuration diagram of a three-dimensional (3D) model system according to an embodiment of the disclosure.

Hereinafter, embodiments disclosed in the specification are described in detail with reference to the accompanying drawings, the same or similar components are denoted by the same or similar reference numerals, and an overlapping description thereof is omitted. In addition, terms "module" and "unit" for components used in the following description are used only to easily make the disclosure. Therefore, these terms do not have meanings or roles that distinguish themselves from each other. Further, when it is determined that a detailed description for the known art related to the disclosure may obscure the gist of the disclosure, the detailed description will be omitted. Furthermore, it is to be understood that the accompanying drawings are provided only to allow the embodiments of the disclosure to be easily understood, and the spirit of the disclosure is not limited by the accompanying drawings and includes all the modifications, equivalents and substitutions included in the spirit and scope of the disclosure.

It is to be understood that terms "include," "have" and the like used in the present application specify the presence of features, numerals, steps, operations, components, parts or combinations thereof, mentioned in the specification, and do not preclude the presence or possible addition of one or more other features, numerals, steps, operations, components, parts or combinations thereof.

Hereinafter, the embodiments of the disclosure are described in detail with reference to the accompanying drawings.

FIG. 1 is a schematic view of a three-dimensional (3D) model device 10 according to the disclosure.

The 3D model device 10 according to an embodiment of the disclosure may generate a 3D drawing, calculate a dimension of a 3D model object disposed in the 3D drawing or a distance between the 3D model objects, and display a calculated value in the 3D drawing. Here, the dimension of the 3D model object may be a dimension of actual equipment, a pipe, or an architectural structure, corresponding to the 3D model object. In addition, the distance between the 3D model objects may be a distance between the actual equipment, the pipes, or the architectural structures, corresponding to the respective 3D model objects.

In the disclosure, the 3D drawing may include all of a single 3D model object formatted as the 3D model in a 3D space or a scene including a combination of the plurality of 3D model objects. For reference, "clipping" hereinafter refers to selecting the 3D model object on a 3D viewer and displaying only the selected 3D model object. The description describes a type of a 3D model object with reference to FIG. 2 together.

Figure 2A:
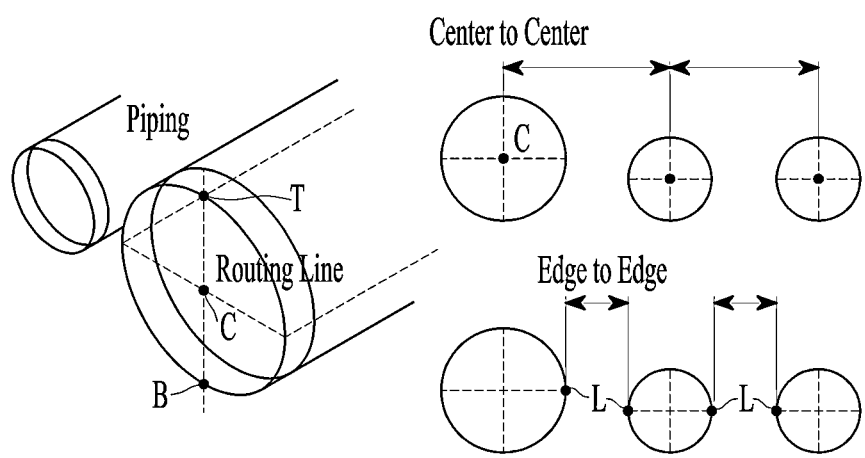
FIGS. 2A and 2B are views each showing a snapping point based on a type of a 3D model object.
Figure 2B:
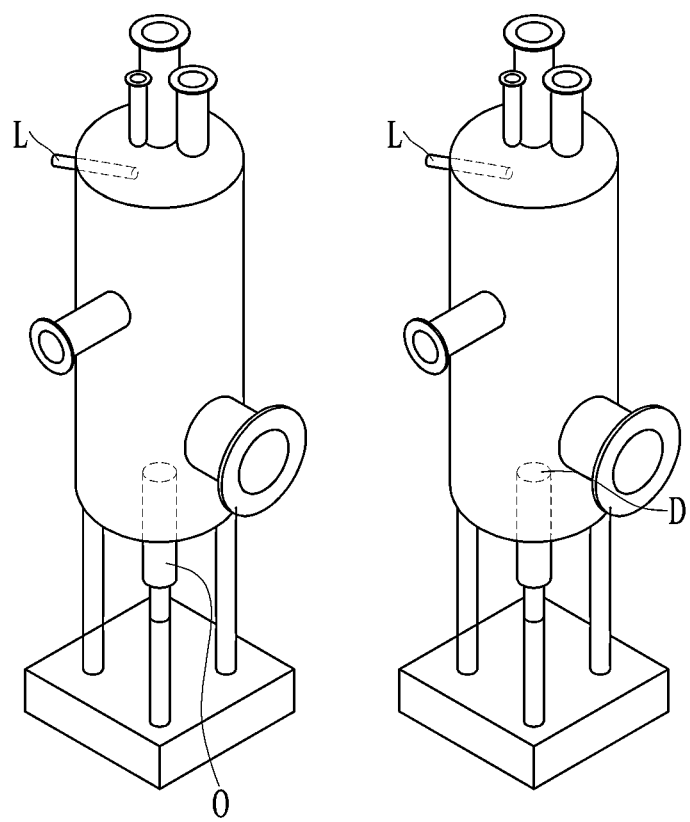

FIGS. 2a and 2b are views each showing a snapping point based on the type of the 3D model object.

The 3D model object may be a model of equipment implemented in a virtual space and may have the same property as the actual equipment.

The 3D model object can be classified into a line object and a point object. The point object may be an object installed at a specified position, and the line object may be an object for routing between the arbitrary point objects. As described below, 3D model data corresponding to each object may include information on each 3D model object property. In addition, the 3D model object can have the snapping point. The snapping point may be a reference point when calculating the distance between the 3D model objects.

FIG. 2A is a view showing the snapping point of the pipe as an example of the line object.

The 3D model object representing the pipe may include information on a pipe property. The pipe property may include, for example, information on the name, object type, oriented direction, thickness, start and end points, length or the like of the pipe. As shown in FIG. 2A, the snapping point of the pipe may be a bottom point B, a center point C, a top point T, an edge point L, or the like.

As another example, the line object may include an architectural structural member. Here, the architectural structural member may include a steel pillar, a steel beam, a concrete pillar, a concrete beam, or the like. An architectural structural member property may include, for example, information on a name of an associated architecture, a length of the member, a material of the member, or the like. The snapping point of the architectural structural member may be a start point S, an end point E, the center point C, the edge point L, or the like.

FIG. 2B is a view showing the snapping point of the equipment as an example of the point object.

The 3D model object can include information on an equipment property. Here, the equipment may include a tank, a pump, a boiler, a vessel, a heat exchanger, or the like. The equipment property may include, for example, information on the name, object type, direction, size, or the like of the equipment. As shown in FIG. 2B, the snapping point of the equipment may be an origin point O, the edge point L, a datum point D, or the like.

However, the points of each 3D model object can be additionally set in addition to the preset snapping points.

As described below, the 3D model device 10 may determine the snapping point based on the type of each 3D model object selected by a user, and calculate a distance between the snapping points. That is, when the user selects the 3D model object even without directly selecting the snapping point, the 3D model device 10 may derive the snapping points based on a snapping point determination rule predefined for each object, and calculate a distance between the selected objects.

In detail, the 3D model device 10 shown in FIG. 1 may include a communication unit 110, an input unit 130, an output unit 150, a memory 170, and a control unit 190.

The communication unit 110 may include one or more modules enabling communication between the 3D model device 10 and a database, between the 3D model device 10 and an arbitrary server, or between the 3D model device 10 and another arbitrary device.

The communication unit 110 can be implemented using wired communication technology such as a local area network (LAN), a wide area network (WAN), a metropolitan area network (MAN), and an integrated service digital network (ISDN), or implemented using wireless communication technology such as a wireless LAN (WLAN), a Bluetooth, a high data rate-wireless personal area network (HDR WPAN), a ultra-wideband (UWB), a zigbee, an impulse radio, a 60 GHz wireless personal area network (WPAN), a binary-code division multiple access (CDMA), wireless universal serial bus (USB) technology, and wireless high-definition multimedia interface (HDMI) technology, and the disclosure is not limited thereto.

The communication unit 110 can receive data for generating the 3D drawing from another arbitrary device. The control unit 190 may then generate the 3D drawing based on the received data for generating the 3D drawing. The data for generating the 3D drawing may be, for example, connection relationship data between piping and the equipment. That is, the data for generating the 3D drawing can include information on a position defined for each target object, grouping of the equipment disposed to be adjacent to the position of the target object, a relationship between the adjacent target objects in the group, or the like.

The input unit 130 may receive the information from the user. The input unit 130 may be configured using a device such as a keyboard, a mouse, a touch key, a mechanical key, or a touch screen.

When the information is input through the input unit 130, the control unit 190 may perform an operation corresponding to the input information.

The input unit 130 can receive, from the user, selection of the 3D model object in the 3D drawing, a viewpoint of the 3D drawing, an arbitrary category, or the like.

The output unit 150 may generate an output related to vision, hearing, touch, or the like. The output unit 150 may include at least one of a display unit, an audio output unit, a haptic module, and an optical output unit 150. The output unit 150 may implement the touch screen by forming a mutual layer structure or being integrated with the touch sensor. This touch screen may function as the input unit 130 and also provide an output interface between the 3D model device 10 and the user.

The output unit 150 can display the 3D drawing. The user can change the viewpoint of the 3D drawing displayed on the output unit 150 through the input unit 130.

For example, each viewpoint of the 3D drawing can be synchronized with the viewpoint of the 3D model object, and the viewpoint of the 3D model object can also be moved to a corresponding viewpoint when the user moves the viewpoint in the 3D drawing. Here, X, Y, or Z vector reference values, a leader line, a reference line, and a dimension auxiliary line may be changed based on a viewpoint direction and a feature of the target object. Further, as described below, necessary information and/or a position where the dimension is displayed may also be changed based on the viewpoint direction.

Hereinafter, the description describes the 3D drawing displayed on the output unit 150 with reference to FIG. 3.

Figure 3:
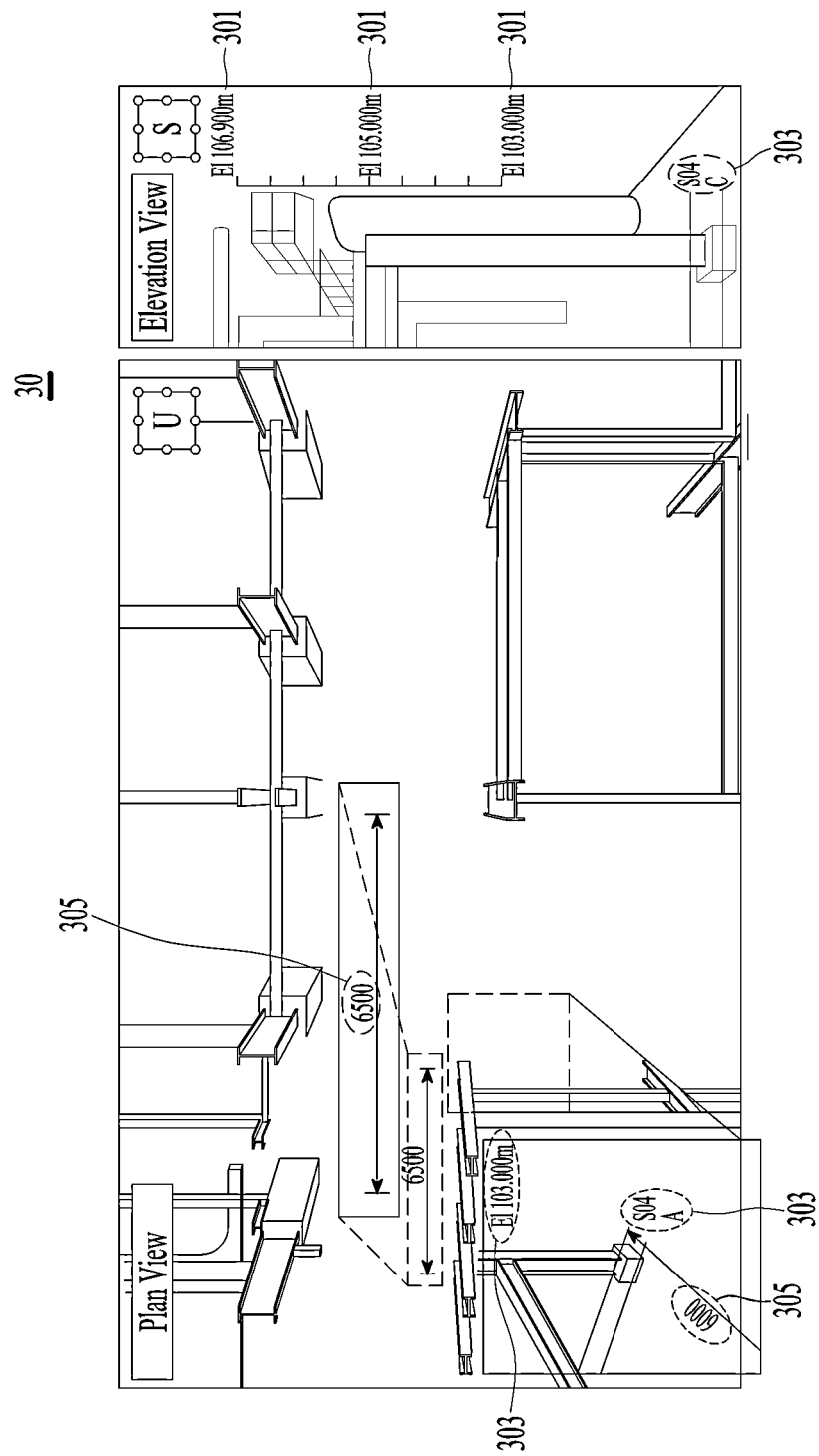
FIG. 3 is an exemplary view of a 3D drawing displayed on an output unit according to an embodiment.

FIG. 3 is an exemplary view of the 3D drawing displayed on the output unit 150 according to an embodiment.

As shown in FIG. 3, a screen 30 displayed on the output unit 150 may include a dimension (i.e., predefined dimension) pre-stored in the memory 170. The screen 30 can include information on a height 301 of each architectural structure, information on a pillar 303 of the architectural structure, and information on a pillar spacing dimension 305 of the architectural structure. The screen 30 can also further include any information among the 3D model data stored in the memory 170.

The memory 170 may store data for supporting various functions of the 3D model device 10. The memory 170 can store a plurality of application programs (i.e., application programs or applications) and instructions driven by the 3D model device 10. At least some of these applications may be downloaded from an external server through wireless communication. Meanwhile, the application program may be stored in the memory 170, installed on the 3D model device 10, and driven by the control unit 190 to perform an operation (or function) of the 3D model device 10.

The memory 170 may include, for example, a NAND flash memory such as a compact flash (CF) card, a secure digital (SD) card, a memory stick, a solid-state drive (SSD), or a micro SD card, a magnetic computer storage device such as a hard disk drive (HDD), or an optical disc drive such as a compact disk read only memory (CD-ROM) or a digital versatile disk read only memory (DVD-ROM).

The memory 170 can include information on the 3D model data, a rule for determining a position where a label is displayed, a rule for determining a position where the calculated value is displayed, or the like.

The 3D model data can include information on the type of the 3D model object, a point determination rule for determining a point of each object, the 3D model object property, an operation condition, or the like. Here, the point may be the snapping point for measuring the distance, or a reference point for calculating the dimension of one equipment. In addition, the 3D model data can include the information on the position defined for each target object, the grouping of the equipment disposed adjacent to the position of the target object, the relationship between the adjacent target objects in the group, or the like. For example, the 3D model data may include a spacing between the pillars of the architectural structure, coordinate information of an architectural grid object that includes the pillar information of the architectural structure, and the grouping information of the associated structure.

In addition, the memory 170 may include information on the calculated value such as the dimension of the 3D model object that is calculated by the control unit 190 and the distance between the 3D model objects. Accordingly, the control unit 190 can check the information on the dimension of the 3D model object and the distance between the 3D model objects, stored in the memory 170 when generating the 3D drawing, and display the same on the 3D drawing to be generated later. Here, the memory 170 is described as being included in the 3D model device 10. However, the memory 170 may be a separate database disposed outside the 3D model device 10.

The control unit 190 may control an overall operation of the 3D model device 10. The control unit 190 may process signals, data, and information input or output through the components described above or drive the application program stored in the memory 170, thereby providing or processing appropriate information or function to the user.

The control unit 190 of the 3D model device 10 may be implemented as software or a program. The software or program can be executed on a computing device to thus perform various functions described below.

In detail, the computing device may include a processor and the memory 170, and the software or program may be stored in the memory 170. The processor may perform a function related to calculating and displaying the distance between the 3D model objects by executing an instruction of the software or program, stored in the memory 170.

The processor may be implemented as a central processing unit (CPU), a graphics processing unit (GPU), an application processor (AP), or the like, the scope of the disclosure is not limited thereto, and the processor may be implemented as any of various programmable processors such as an application-specific integrated circuit (ASIC) and a field programmable gate array (FPGA). Meanwhile, the memory 170 may be implemented as a random access memory (RAM), a read only memory (ROM), or the like, and the scope of the disclosure is not limited thereto.

The control unit 190 can generate the 3D drawing. The 3D drawing can include the plurality of 3D model objects.

In detail, the control unit 190 can generate the 3D drawing based on the 3D model data. Alternatively, the control unit 190 may generate the 3D drawing based on the 3D model data for the 3D model object input through the input unit 130 by the user and the position of each 3D model object. A method of generating the 3D drawing is not limited, may be obvious to those skilled in the art, and its detailed description is thus omitted.

Figure 4A:
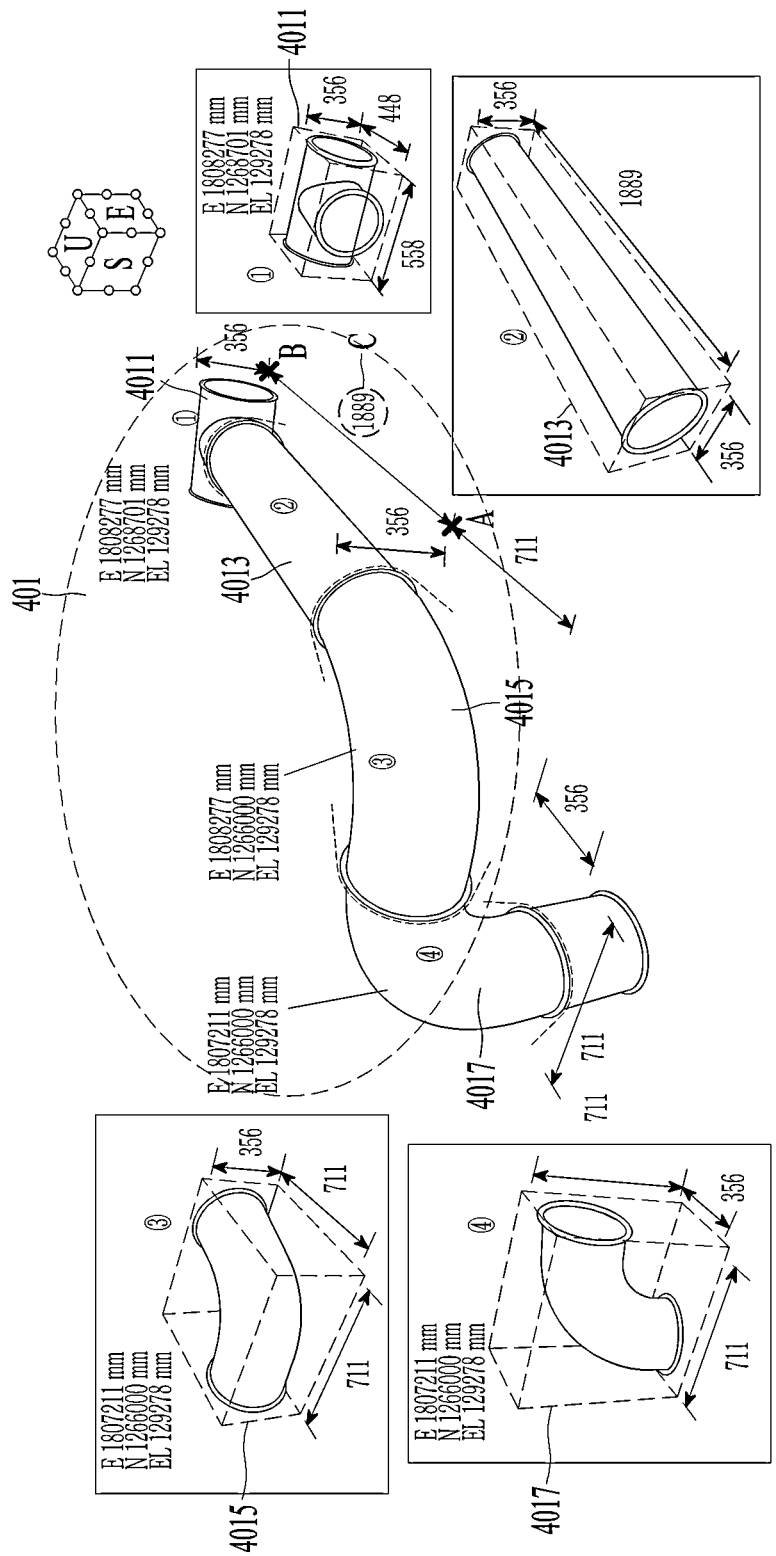
FIGS. 4A and 4B are exemplary views each showing the 3D drawing displayed on the output unit when a user selects at least one 3D model object through an input unit.
Figure 4B:
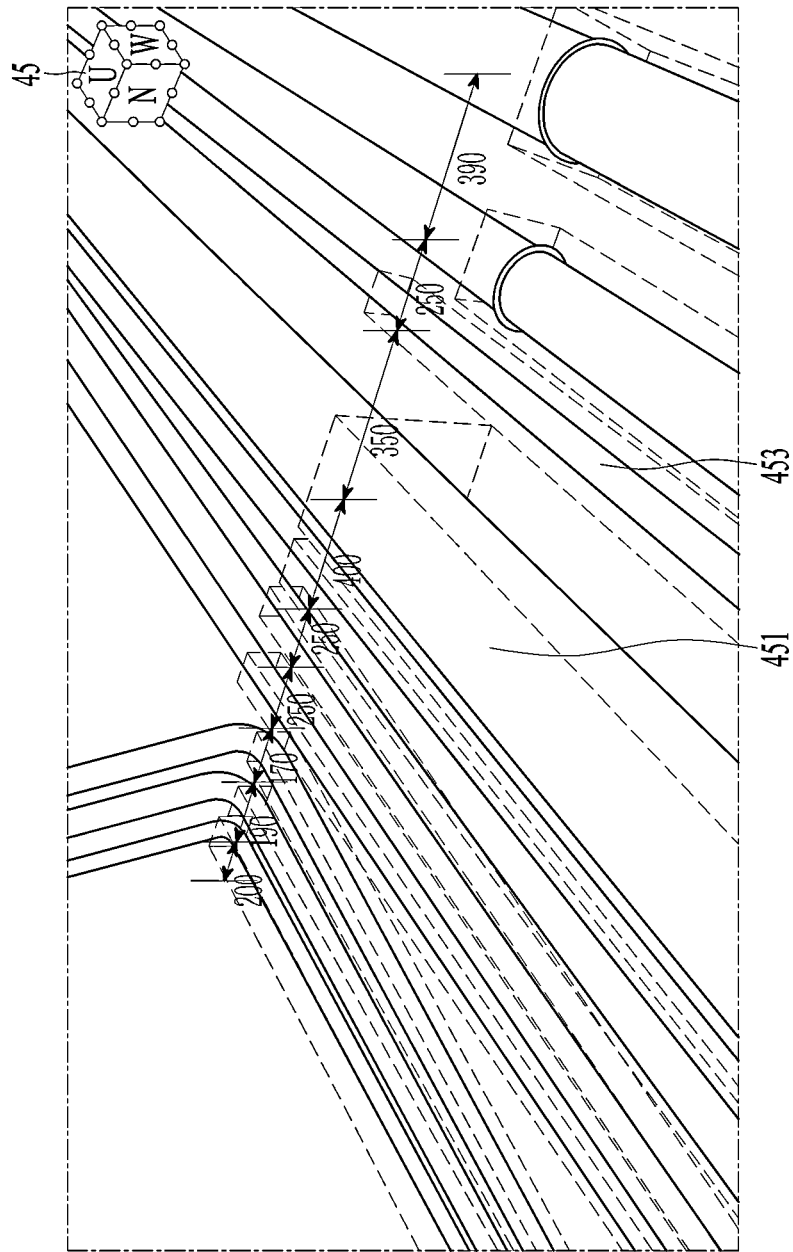

The control unit 190 can calculate the dimension of one 3D model object and the distance between the plurality of 3D model objects. The description describes this configuration in detail below with reference to FIGS. 4A and 4B. FIGS. 4A and 4B are exemplary views each showing the 3D drawing displayed on the output unit 150 when the user selects at least one 3D model object through the input unit 130.

FIG. 4A shows a screen 40 showing an example of the 3D drawing displayed on the output unit 150 when the user selects the 3D model object (or an individual object dimension) through the input unit 130.

First, the input unit 130 can receive, from the user, the selection of one 3D model object in the 3D drawing. The control unit 190 may then determine the type of the selected 3D model object based on the 3D model data corresponding to the selected 3D model object. The control unit 190 can collect the necessary information based on the type of the 3D model object.

For example, the control unit 190 can check a point type based on the 3D model data of the 3D model object, and determine point coordinate information when the selected 3D model object is the point object. A point coordinate type of the point object can include the origin point, the edge point, and the datum point.

The control unit 190 can analyze a line object direction based on coordinates of both ends of the 3D model object when the selected 3D model object is the line object. The point coordinate type of the line object can include the bottom point, the center point, the top point, and the edge point.

The control unit 190 may calculate a dimension of the selected 3D model object based on the determined point coordinate information and/or line object direction, and the 3D model data. Here, when the selected 3D model object includes the plurality of components, the control unit 190 may calculate a separate dimension of each component. In addition, the 3D model data can include data for each component in one 3D model object.

For example, the description describes a case where the user selects a plurality of parts 4011, 4013, 4015, and 4017 of 3D model object 401 through the input unit 130, as shown in FIG. 4A.

The control unit 190 may determine that the 3D model object 401 is the line object based on the 3D model data of the 3D model object 401. The 3D model data of the 3D model object 401 may include information on the type of the 3D model object, point determination rule, property, or the like of the 3D model object 401. The control unit 190 may collect line direction information based thereon. The control unit 190 can then determine an appropriate position where the dimension of the 3D model object 401 is to be displayed based on the point coordinate information and the 3D model data, and can then display the dimension of the 3D model object 401 at the determined position.

In detail, the control unit 190 can determine coordinates of points A and B based on the 3D model data of the 3D model object 401 in the second part 4013. The 3D model data can include information on the object type, the pipe length, or the like. In this case, the 3D model data can include the object type information of each part included in the 3D model object 401, a length or the like of each part of the 3D model object 401. The control unit 190 may display a difference between coordinates A and B at a center C of the points A and B, which are respective ends of the second part 4013, to be parallel to the line object direction of the second part 4013.

FIG. 4B shows a screen 45 showing an example of the 3D drawing displayed on the output unit 150 when the user selects the plurality of 3D model objects (or a dimension between the objects) through the input unit 130.

First, the input unit 130 can receive, from the user, the selection of at least two 3D model objects in the 3D drawing. The control unit 190 may then determine each type of the selected 3D model object based on the 3D model data corresponding to each of the selected 3D model objects. The control unit 190 can collect the necessary information based on the type of the 3D model object.

The control unit 190 can group the adjacent targets among the selected 3D model objects. For example, the control unit 190 can group the two 3D model objects disposed to be adjacent to each other into one group. Here, the control unit 190 can group the two 3D model objects disposed to be adjacent to each other into one group based on the 3D model data stored in the memory 170.

Next, the control unit 190 can classify a group relationship between the grouped 3D model objects. The control unit 190 can then calculate the distance between the 3D model objects.

In detail, the control unit 190 may use each point coordinate to thus calculate at least one of an x axis distance, a y axis distance, a z axis distance, and the shortest distance when all the 3D model objects are the point objects. The control unit 190 can calculate a distance difference between the point coordinate and a coordinate in a direction orthogonal to a line when one of the 3D model objects is the line object and the other is the point object. In addition, the control unit 190 can calculate a distance difference in the direction orthogonal to the line when all the 3D model objects are the line objects.

For example, the description describes a case where the user selects the plurality of 3D model objects through the input unit 130, as shown in FIG. 4B. For example, the description describes a case where the control unit 190 groups a first object 451 and a second object 453 among the plurality of selected 3D model objects into one group.

The control unit 190 can classify all the first object 451 and the second object 453 as the line objects based on the 3D model data of each of the first object 451 and the second object 453. Here, the control unit 190 can analyze that a direction in which the first object 451 or the second object 453 is oriented is a south to north (S-N) direction based on the 3D model data of each of the first object 451 and the second object 453. The control unit 190 can then classify all the 3D model objects as the line objects. Therefore, the control unit 190 can calculate the shortest vertical distance between the first object 451 and the second object 453 in the direction orthogonal to the line (that is, an east to west (E-W) direction).

In addition, the control unit 190 can calculate a distance (or a cube dimension) between all objects disposed in an arbitrary space. The description describes this configuration in detail below with reference to FIG. 5.

Figure 5:
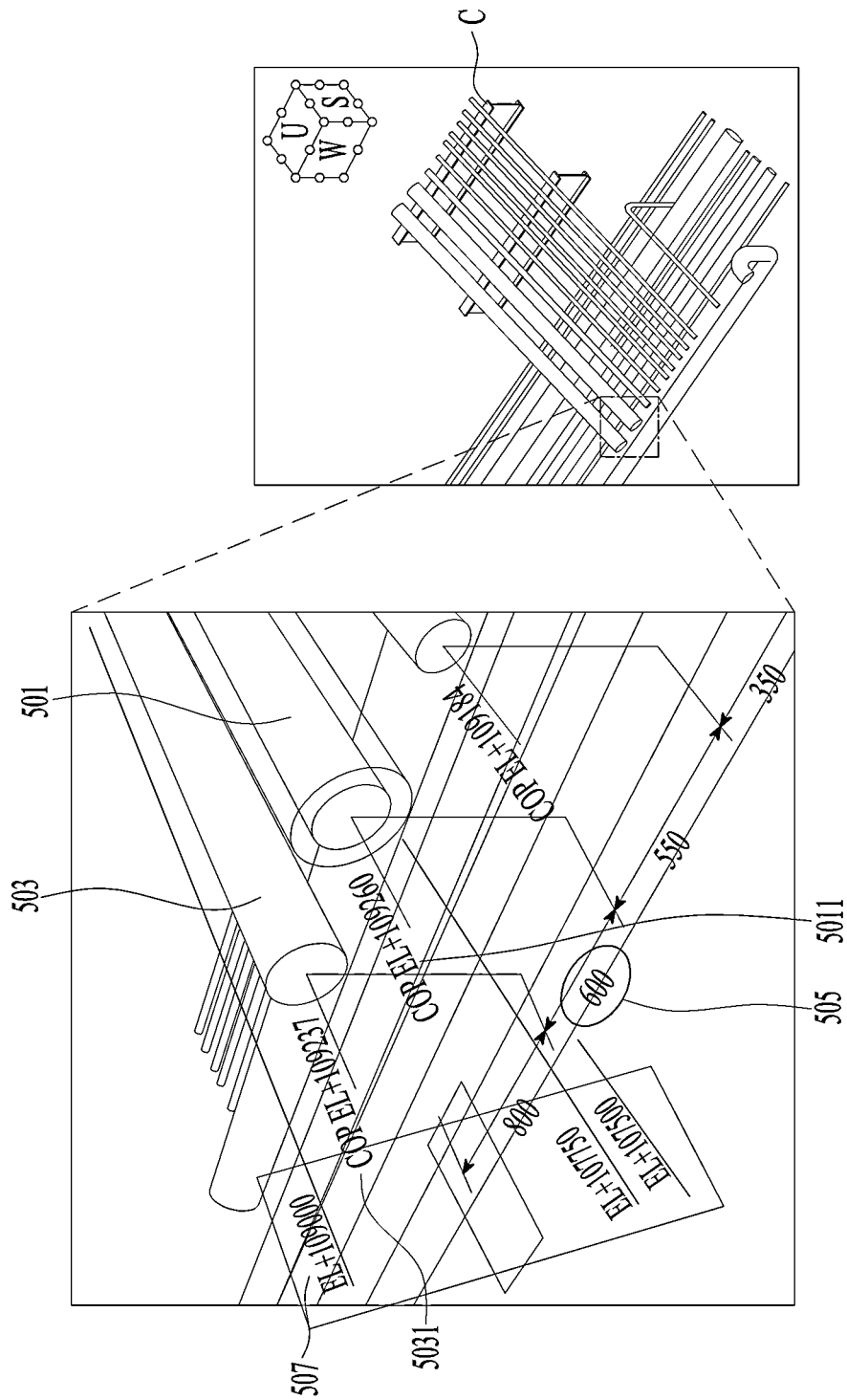
FIG. 5 is an exemplary view showing the 3D drawing displayed on the output unit when the user selects an arbitrary category through the input unit.

FIG. 5 is an exemplary view showing the 3D drawing displayed on the output unit when the user selects the arbitrary category through the input unit.

The user can select a region of the category the user wishes to check in the 3D drawing through the input unit 130. For example, the input unit 130 may receive a coordinate of a point disposed at each edge of the category, or a category size.

The control unit 190 can determine the 3D model object disposed in the arbitrary category that is input by the user. The control unit 190 can determine the type of the 3D model object for each 3D model object. The control unit 190 can collect the necessary information based on the type of the 3D model object. The control unit 190 can calculate a distance between the adjacent objects among the 3D model objects disposed in the category. This method is the same as the method described above. Next, the control unit 190 can display information on each 3D model object or the distance between the adjacent objects among the 3D model objects at an appropriate position based on the point coordinate information, the 3D model data, and the input category.

For example, the description describes a case where the user selects an arbitrary category C through the input unit 130, as shown in FIG. 5. When the category C is selected, the control unit 190 can determine the 3D model object disposed in the selected category. For example, the control unit 190 may determine that a first 3D model object 501 and a second 3D model object 503 are disposed in the selected category.

The control unit 190 may determine that all the first 3D model object 501 and the second 3D model object 503 are the line objects. Accordingly, the control unit 190 can analyze the point coordinates and the line object directions of the first 3D model object 501 and the second 3D model object 503.

The line object direction of the first 3D model object 501 or the second 3D model object 503 may be a west to east (W-E) direction. Therefore, the control unit 190 may use a method of calculating the distance between the line objects to thus calculate a distance difference between the first 3D model object 501 and the second 3D model object 503 in the direction orthogonal to the line (that is, the S-N direction).

The control unit 190 may display the calculated distance at a second position 507.

In addition, the control unit 190 may display information on the first 3D model object 501 and the second 3D model object 503 at an appropriate position outside a cube. In detail, the control unit 190 may display height information of the architectural structural member on which the first 3D model object 501 and the second 3D model object 503 are disposed at the second position 507. In addition, the control unit 190 may display the height information of the first 3D model object 501 at a first position 5011 on an outskirt of the cube, and display information on the second 3D model object 503 at a second position 5031 on the outskirt of the cube.

Alternatively, the control unit 190 may only calculate the distance between a specific type of objects disposed in the arbitrary category based on a predetermined rule for various objects required to be checked based on a design field (e.g., civil design, architectural design, piping design, electrical design, or control design). In detail, the user can predetermine rules for the 3D model object required to be checked and information required to be checked through the input unit 130, and these rules may be stored in the memory 170. For example, the user can set, through the input unit 130, a piping plan rule that the 3D model objects required to be checked in a piping design field are the pipes, the equipment, and the architectural structural members, and the information required to be checked is the distance between the 3D model objects.

When the user then selects one rule among several rules pre-stored in the memory 170 through the input unit 130, the control unit 190 can calculate specified information targeting an object satisfying a corresponding rule among the 3D model objects disposed in the arbitrary category, and display the same through the output unit 170.

For example, when the user selects the piping plan rule through the input unit 130, the control unit 190 can display a height of the pipe, the height of the architectural structure, the pillar information of the architectural structure, or the like at an appropriate position on an outskirt of the selected arbitrary category through the output unit 170, calculate distances between the pipes, the equipment, and the architectural structural members, and display the same at appropriate positions. That is, the control unit 190 can only calculate and display the distance between the pipes, the equipment, and the architectural structural members, included in the arbitrary category without calculating the distance between the 3D objects, such as a cable way and a cable tray, which are not set in the rule.

Here, many objects may exist in the 3D space, and it may thus be difficult to check their information and dimensions due to interference occurring between the 3D model objects disposed in the arbitrary category. As described below, the control unit 190 may increase user visibility by hiding an unnecessary 3D model object outside a clipped category, and displaying the necessary information and dimensions of the necessary 3D model object in the category at a position on the outskirt of the category through the output unit 170.

The control unit 190 can determine at which position the information on the 3D model object is to be displayed in the 3D drawing. In detail, the control unit 190 can determine a position based on the rule for determining the position where the label stored in the memory 170 is displayed. The description describes this configuration below with reference to FIG. 6.

FIG. 6 is a view showing the position where necessary information is displayed based on the type of the 3D model object.

The control unit 190 can determine the type of the 3D model object based on the 3D model data, and derive the necessary information based on the type of the 3D model object. The control unit 190 can then determine a display position for the necessary information to be appropriately displayed based on the type of the 3D model object. Here, based on the type of the 3D model object, the position where the necessary information is displayed may be pre-stored in the memory 170. The control unit 190 may determine that only some of the necessary information to be displayed based on a user selection. In addition, the control unit 190 can determine a different position where the necessary information is displayed based on each viewpoint of the 3D drawing.

For example, when classifying the 3D model object as the pipe, the control unit 190 may derive the necessary information of the pipe from the 3D model data. As shown in FIG. 6, the necessary information of the pipe may include information on the start point, the center point, and the end point. As shown at a section 0 of FIG. 6, the control unit 190 can determine the derived information to be displayed on four side surfaces of the pipe.

However, this description of the display position determination rule is exemplary, and the control unit 190 may use an arbitrary rule to determine the position where the information is displayed.

The control unit 190 can determine the position based on the rule for determining a position where the value stored in the memory 170 is displayed. The description describes this configuration below with reference to FIGS. 7A to 7C.

Figure 7B:
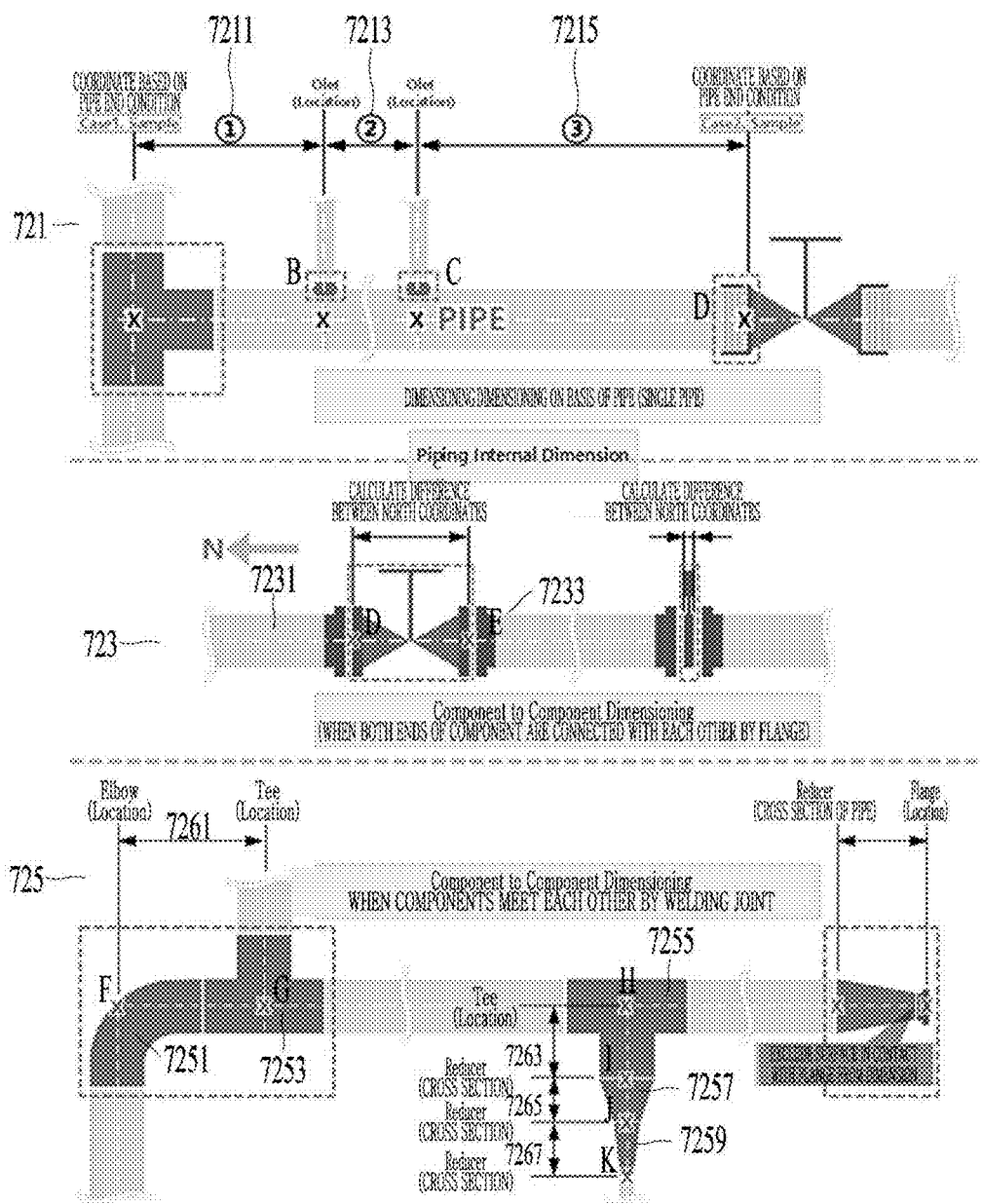

FIGS. 7A and 7B are views each showing the position where the value pre-stored in the memory 170 is displayed based on the type of the 3D model object.

FIG. 7A is an exemplary view showing the spacing between the pillars of the architectural structure at the position defined by the rule. The spacing between the pillars of the architectural structure may be displayed based on the coordinate information and associated structure grouping information of the architectural grid object that includes the pillar information of the architectural structure.

As shown in FIG. 7A, the pre-stored dimensions may be displayed at a first position 7101, a second position 7103, a third position 7105, and a fourth position 7107, a fifth position 7109, and a sixth position 7111, disposed on outskirts of an upper part U of a grid.

FIG. 7B is an exemplary view showing the position where the pre-stored dimension is displayed when the 3D model object is the pipeline.

The pipeline can include a group of pipe objects including a single pipe, a valve, a flange, or the like. A rule of the snapping point can be defined based on types of middle and end parts of each pipe object included in the pipeline.

FIG. 7B shows a first case 721 showing a dimension when the 3D model object is the single pipe, a second case 723 where two components included in the pipeline are connected to each other by a flange, and a third case 725 where two components included in the pipeline are connected to each other by welding. The displayable dimension may be different based on the type of the 3D model object and a connection relationship between the adjacent objects.

In the first case 721, the snapping points of the equipment can be A, B, C, and D. That is, when there is a pipe object (e.g., branch or olet) for the pipe to branch in the middle of the pipeline, a point where a center line of the branched pipeline and a center line of a main pipe intersect can be the snapping point. A dimension between the point A and the point B may be displayed at the first position 7211, a dimension between the point B and the point C may be displayed at the second position 7213, and a dimension between the point C and the point D may be displayed at the third position 7215. Here, each dimension between the snapping points may be a value calculated by the control unit 190.

In the second case 723, a first component 7231 and a second component 7233 may be connected to each other by the flange, and the snapping point of the first component 7231 may be D, and the snapping point of the second component 7233 may be E. Here, a dimension between the point D and the point E can be displayed at a fourth position 7235.

In the third case 725, a third component 7251 and a fourth component 7253 may be connected to each other by welding, a fifth component 7255 and a sixth component 7257 may be connected to each other by welding, and a sixth component 7257 and a seventh component 7259 may be connected to each other by welding. Here, the snapping points of the respective component may be F, G, H, I, J, and K. Here, a dimension between the point F and the point G can be displayed at a fifth position 7261, a dimension between the point H and the point I can be displayed at a sixth position 7263, and a dimension between the point I and the point J can be displayed at a seventh position 7265, and a dimension between the point J and the point K may be displayed at an eighth position 7267.

To summarize, when the 3D model object is the pipeline, the pre-stored dimension may be the distance between the snapping points specified by the rule based on the type of the 3D model object and the connection relationship between the adjacent objects.

Figure 7C:
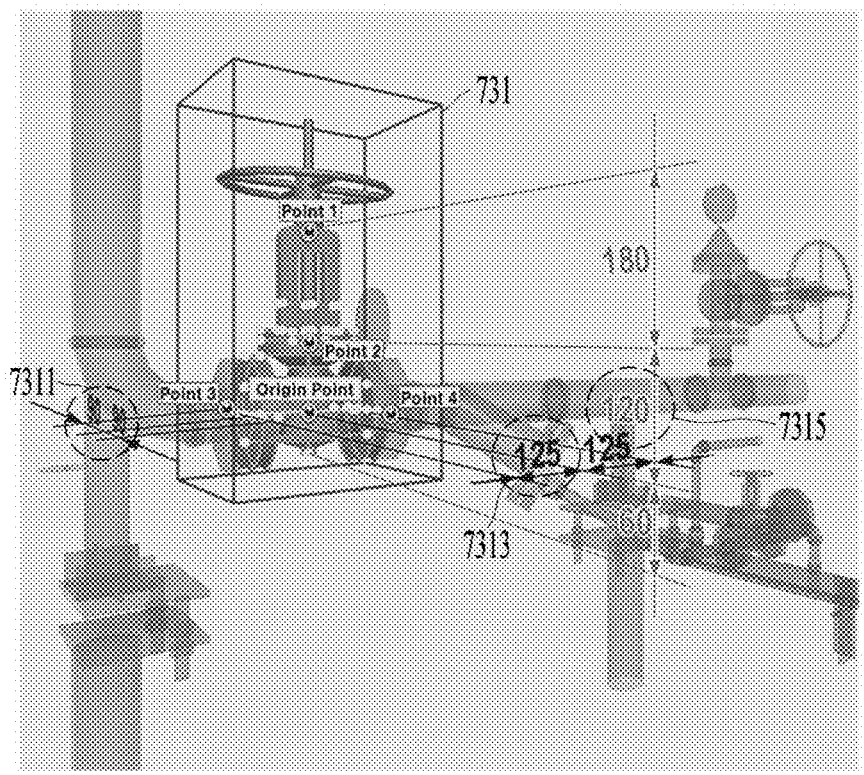
FIG. 7C is a view showing a position where a value calculated based on a rule is displayed at a predefined snapping point of a selected 3D model object.

FIG. 7C is a view showing a position where the value calculated based on the rule is displayed at a predefined snapping point of the selected 3D model object. FIG. 7C is an exemplary view showing a position of a specific dimension of one object is displayed based on the pre-stored rule when an arbitrary 3D object is selected through the input unit 130. In detail, FIG. 7C shows a dimension between the adjacent points by calculating a position relationship between specific points defined in the object when the user selects the single 3D model object to be checked through the input unit 130.

For example, the user can select a piping valve object through the input unit 130. The control unit 190 can then determine position coordinates of the points predefined by the rule among many points included in the piping valve object. The control unit 190 can determine a region where dimension of formation is to be displayed based on information on an outskirt size of the selected object. In addition, the control unit 190 may calculate a distance between the specified points and display the value on the object outskirt. In detail, the control unit 190 can collect the x axis, y axis, and z axis coordinate values of the origin point and those of each point, calculate a distance between the adjacent points in the axial direction, and display the same on the object outskirt. Distances between the points of the selected object defined based on the rule may be displayed at an eighth position 7311, a ninth position 7313, and a tenth position 7315.

However, this description of the display position determination rule is exemplary, and the control unit 190 may use the arbitrary rule to determine the position where the dimension and/or the information are to be displayed in the 3D drawing.

Figure 8:
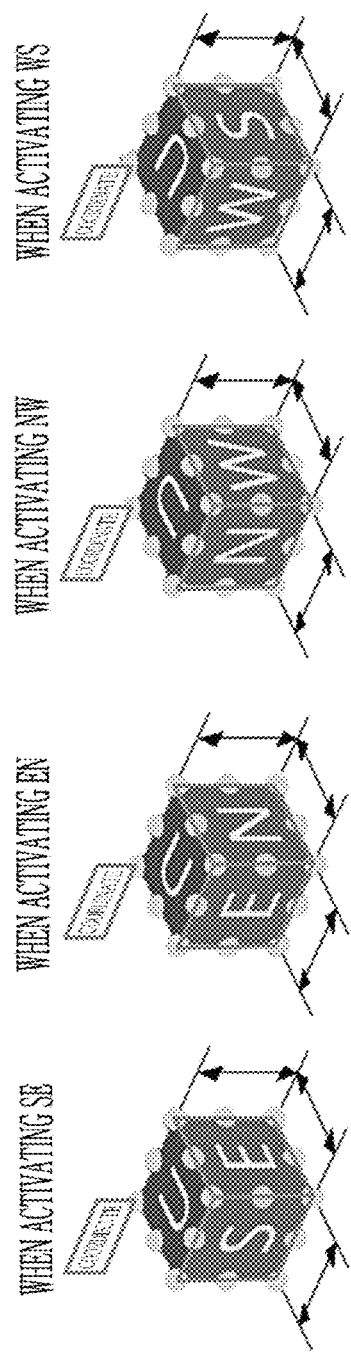
FIG. 8 is an exemplary view showing a position where a dimension is displayed based on a user viewpoint direction.

FIG. 8 is an exemplary view showing the position where the dimension is displayed based on a user viewpoint direction.

The control unit 190 can determine the position where the dimension is displayed by considering the user viewpoint direction by preventing a case where the calculated dimension of formation overlaps with or is invisible by being obscured by the selected 3D model object.

For example, as shown in FIG. 8, when the user viewpoint direction is a south to east (S-E) direction, an east to north (E-N) direction, a north to west (N-W) direction, or a west to south (W-S) direction, the control unit 190 can determine that an x axis or y axis dimension is to be displayed on a lower bottom surface and a z axis dimension is to be displayed on a right side in a direction of an activated 3D viewer. That is, when the user viewpoint direction is the S-E direction, the control unit 190 can determine that the direction of the activated 3D viewer is the S-E direction, and determine that the x axis dimension is to be displayed on the bottom of a S-direction surface, the y axis dimension is to be displayed on the bottom of an E-direction surface, and the x axis dimension is to be displayed on a right side surface of the E-direction surface.

Meanwhile, the control unit 190 may calculate the distance between selected 3D model objects and determine a position where the distance is displayed based on the user viewpoint direction, the type of the 3D model object, and the group relationship between the 3D model objects. Hereinafter, the description describes a position where the value calculated by the control unit 190 is displayed based on the group relationship between the 3D model objects in detail with reference to FIGS. 9A to 9C, 10A, 10B, and 11A to 12B.

FIGS. 9A, 9B, 10A and 10B are exemplary views showing a position where the control unit 190 displays the calculated distance when all the adjacent 3D model objects are the line objects.

The control unit 190 can determine all the 3D model objects as the line objects. The control unit 190 may then collect line direction information based on each 3D model data. Next, the control unit 190 may calculate the distance between the 3D model objects based on the line direction information and the user viewpoint direction, and determine a position where the calculated distance is displayed.

Figure 9A:
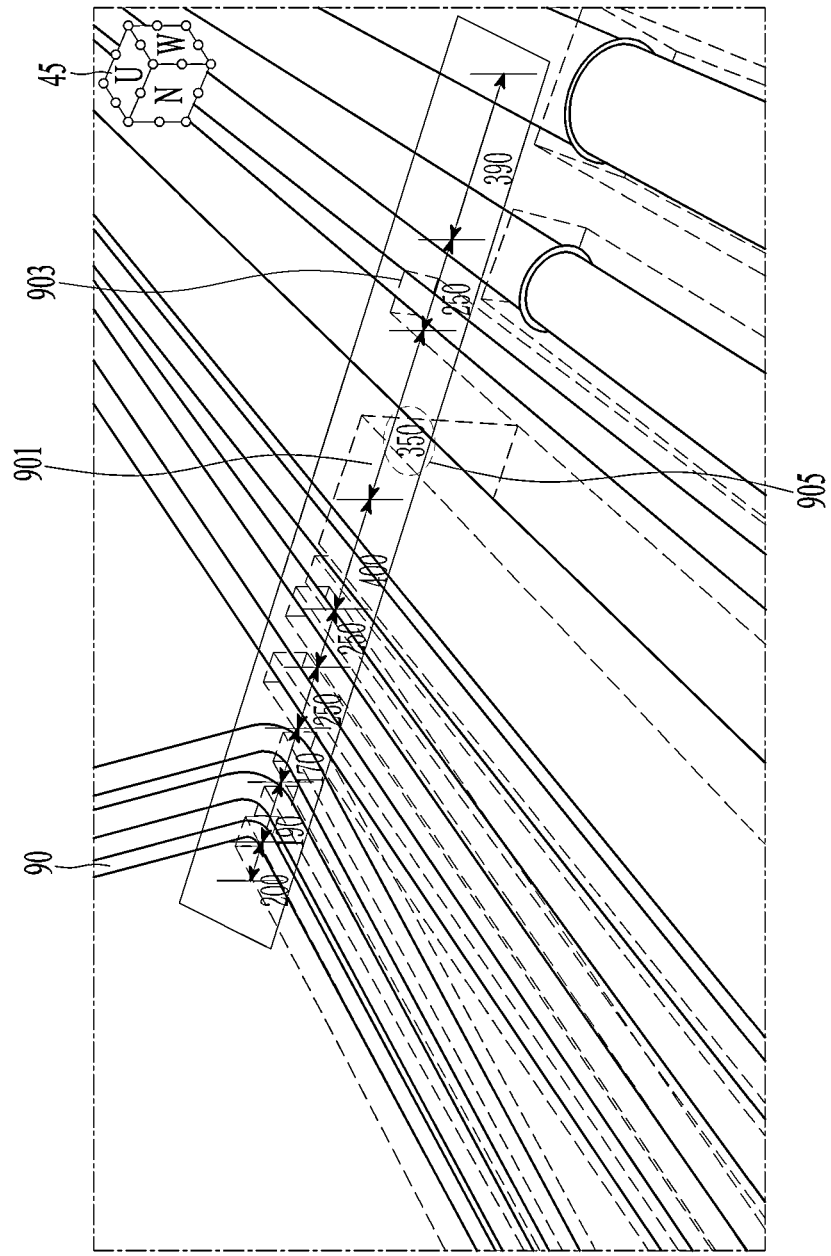
FIGS. 9A and 9B are views each showing a position where a calculated distance is displayed when all the adjacent 3D model objects are horizontal line objects.
Figure 9B:
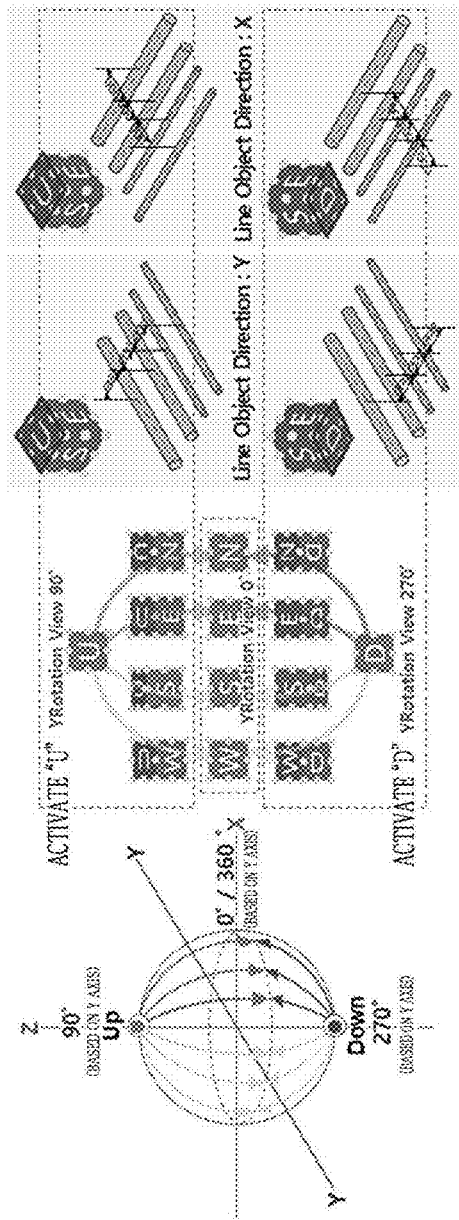

FIGS. 9A and 9B are views each showing the position where the calculated distance is displayed when all the adjacent 3D model objects are horizontal line objects.

FIG. 9A is a view showing a position where the calculated distance between the horizontal line objects is displayed.

A screen 90 may include a reference 3D model object 901, a target 3D model object 903, and a distance 905 between the objects.

The control unit 190 may determine that all the reference 3D model object 901 and the target 3D model object 903 are the line objects based on the 3D model data of each of the reference 3D model object 901 and the target 3D model object 903. The control unit 190 can then collect the information where a line direction of the reference 3D model object 901 is a north to south (N-S) direction, and a line direction of the target 3D model object 903 is the N-S direction. Next, the control unit 190 can calculate the vertical shortest distance between the reference 3D model object 901 and the target 3D model object 903. In addition, the control unit 190 may determine the calculated vertical shortest distance to be displayed along with a dimension line at the first position 905. The control unit 190 can further display the reference line, a reference plane, or the like to improve user visibility.

FIG. 9B is a view showing the position where the distance between the horizontal line objects is displayed based on the user viewpoint direction.

As shown in FIG. 9B, when the user viewpoint direction is upward U, the distance may be displayed upward U regardless of a direction the line object is oriented. In addition, when the user viewpoint direction is downward D, the calculated distance of the control unit 190 may be displayed downward D.

Figure 10A:
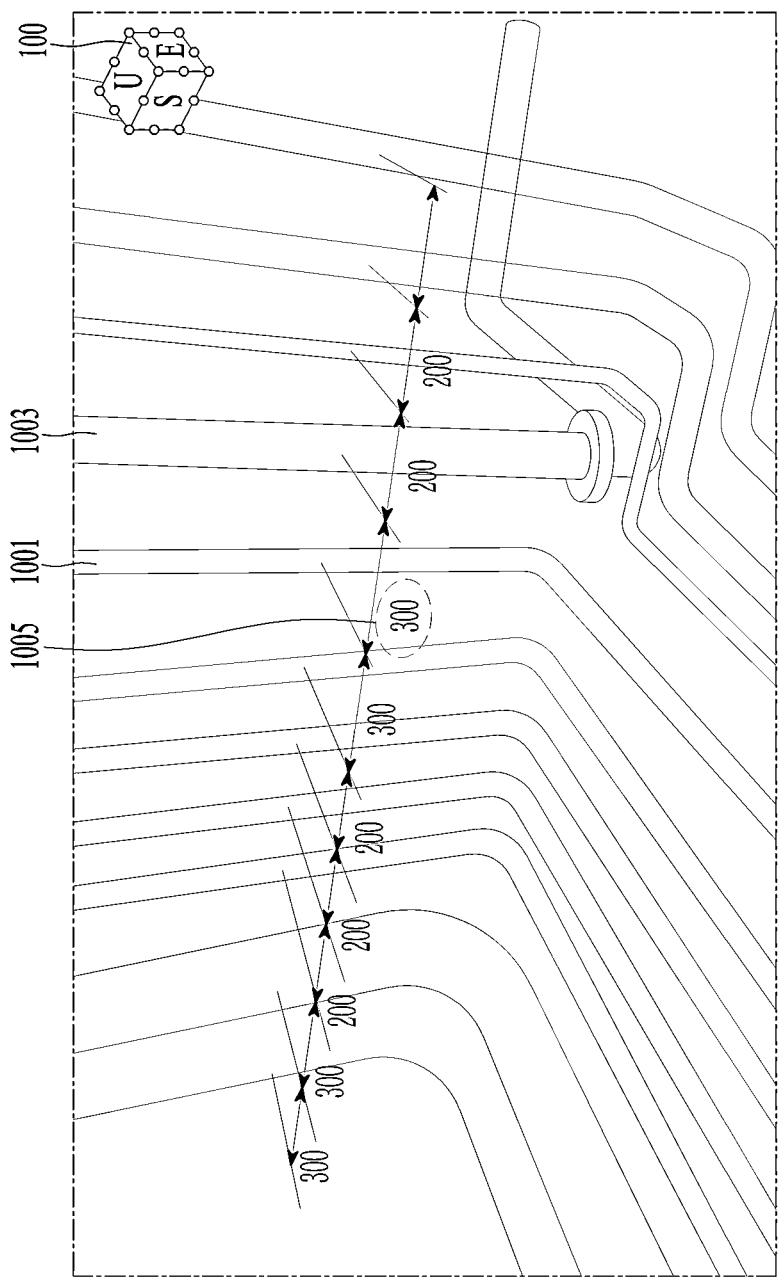
FIGS. 10A and 10B are views each showing a position where the calculated distance is displayed when all the adjacent 3D model objects are vertical line objects.
Figure 10B:
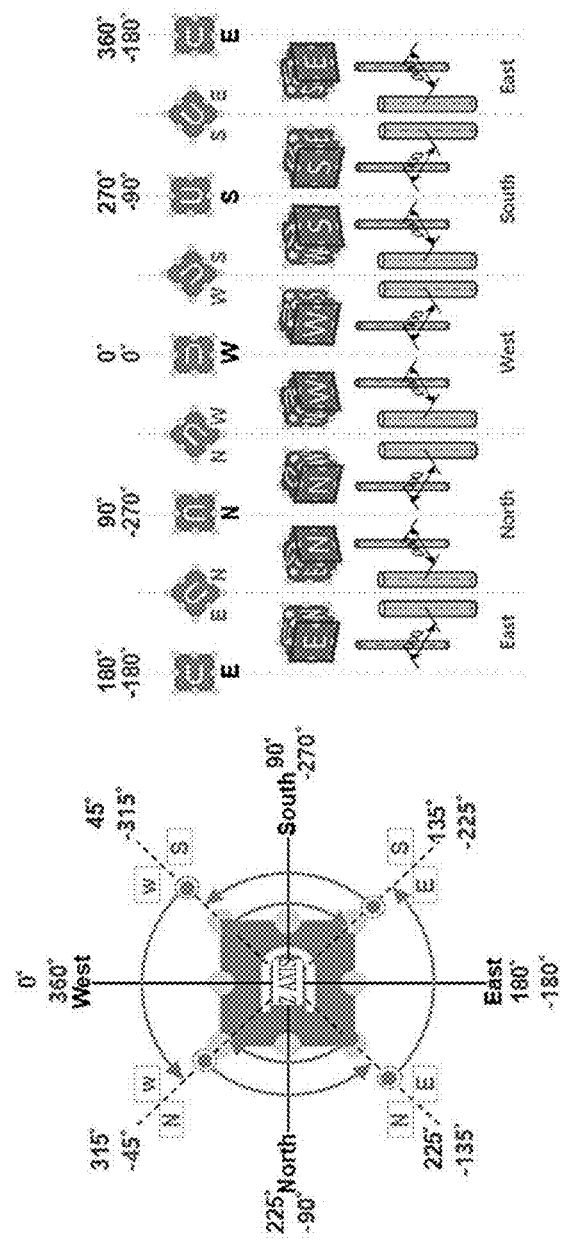

FIGS. 10A and 10B are views each showing the position where the calculated distance is displayed when all the adjacent 3D model objects are vertical line objects.

FIG. 10A is a view showing a position where the distance between the vertical line objects is displayed.

A screen 100 may include a reference 3D model object 1001, a target 3D model object 1003, and a distance 1005 between the objects.

The control unit 190 may classify that all the reference 3D model object 1001 and the target 3D model object 1003 are the line objects based on the 3D model data of each of the reference 3D model object 1001 and the target 3D model object 1003. The control unit 190 may collect information where a line direction of the reference 3D model object 1001 is an upward to downward (U-D) direction, and a line direction of the target 3D model object 1003 is the U-D direction. Next, the control unit 190 can calculate the horizontal shortest distance between the reference 3D model object 1001 and the target 3D model object 1003. In addition, the control unit 190 may determine the calculated horizontal shortest distance to be displayed at the second position 1005. The control unit 190 can further display the reference line, the reference plane, or the like to improve the user visibility.

FIG. 10B is a view showing the position where the distance between the vertical line objects is displayed based on the user viewpoint direction.

The control unit 190 may display the calculated value based on the user viewpoint direction relative to a z axis. In detail, the control unit 190 may determine whether the user viewpoint direction is east (E), west (W), south(S), or north (N), and display the calculated value on a plane where the largest area is visible.

As shown in FIG. 10B, the control unit 190 can determine the dimension to be displayed in the east (E) when an area in the east (E) is most visible. The control unit 190 can determine the dimension to be displayed in the west (W) when an area in the west (W) is most visible. The control unit 190 can determine the dimension to be displayed in the south(S) when an area in the south(S) is most visible. The control unit 190 can determine the dimension to be displayed in the north (N) when an area in the north (N) is most visible.

FIGS. 11A to 11C, 12A and 12B are exemplary views each showing the position where the distance is displayed when one of the adjacent 3D model objects is the point object and the other is the line object.

Figure 11A:
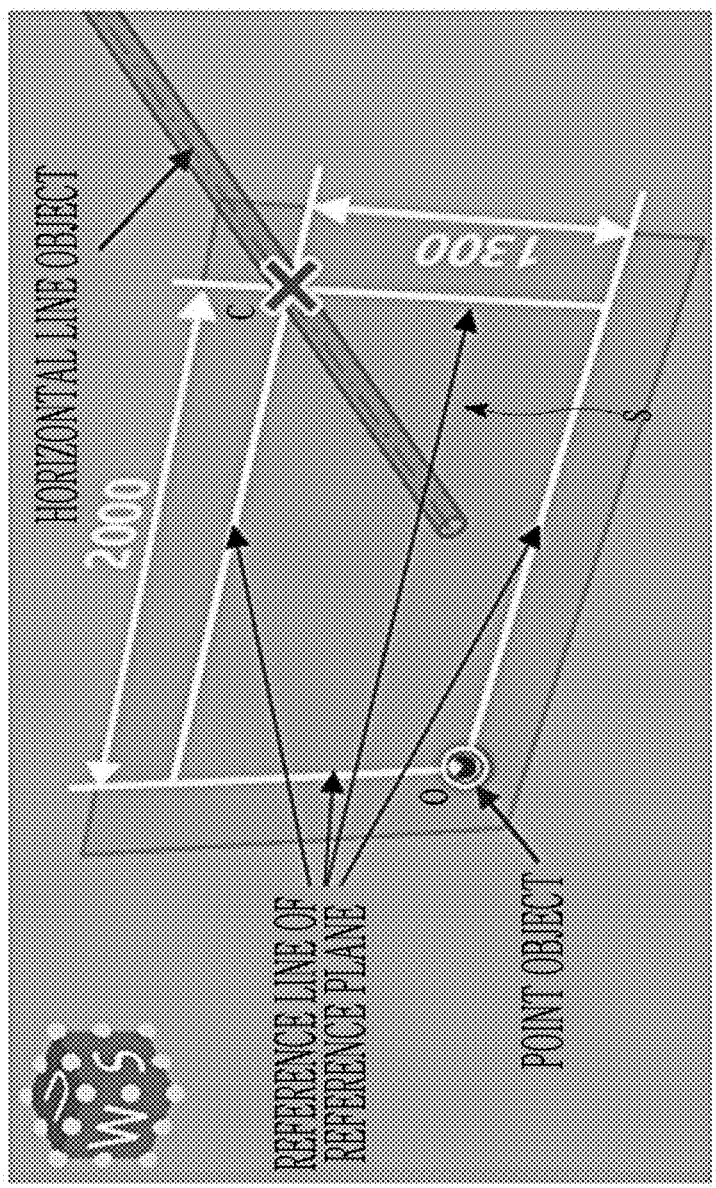
FIGS. 11A to 11C are exemplary views each showing a position where the distance is displayed when one of the adjacent 3D model objects is a point object and the other is the horizontal line object.

FIG. 11A is an exemplary view showing the position where the distance is displayed when one of the adjacent 3D model objects is the point object and the other is the horizontal line object.

The control unit 190 can determine that one of the adjacent 3D model objects is the line object and the other is the point object. The control unit 190 can collect the line direction information of the line object based on the 3D model data of the line object, and determine the position relationship, that is, to which axis the line object is parallel based thereon. Here, the control unit 190 can determine whether the line object is the horizontal line object parallel to an x axis and a y axis, or the vertical line object parallel to the z axis. The description describes this configuration in detail below with reference to FIGS. 11B and 11C.

Next, the control unit 190 can generate a reference plane S that is orthogonal to the line object and passes through a point O of the point object. Here, the point of the point object may be the origin point. In addition, the control unit 190 can calculate a distance between a point C of the line object where the reference plane S and the line object meet each other and the point O of the point object. The control unit 190 can then calculate a distance between the point of the point object where the reference plane and the point object meet each other and the point of the line object. Here, the point of the line object may be the arbitrary center point positioned on the center line parallel to the line direction.

The control unit 190 can determine the position where the calculated distance is displayed based on the reference plane, the position relationship between the 3D model objects, and the line direction of the line object.

Figure 11B:
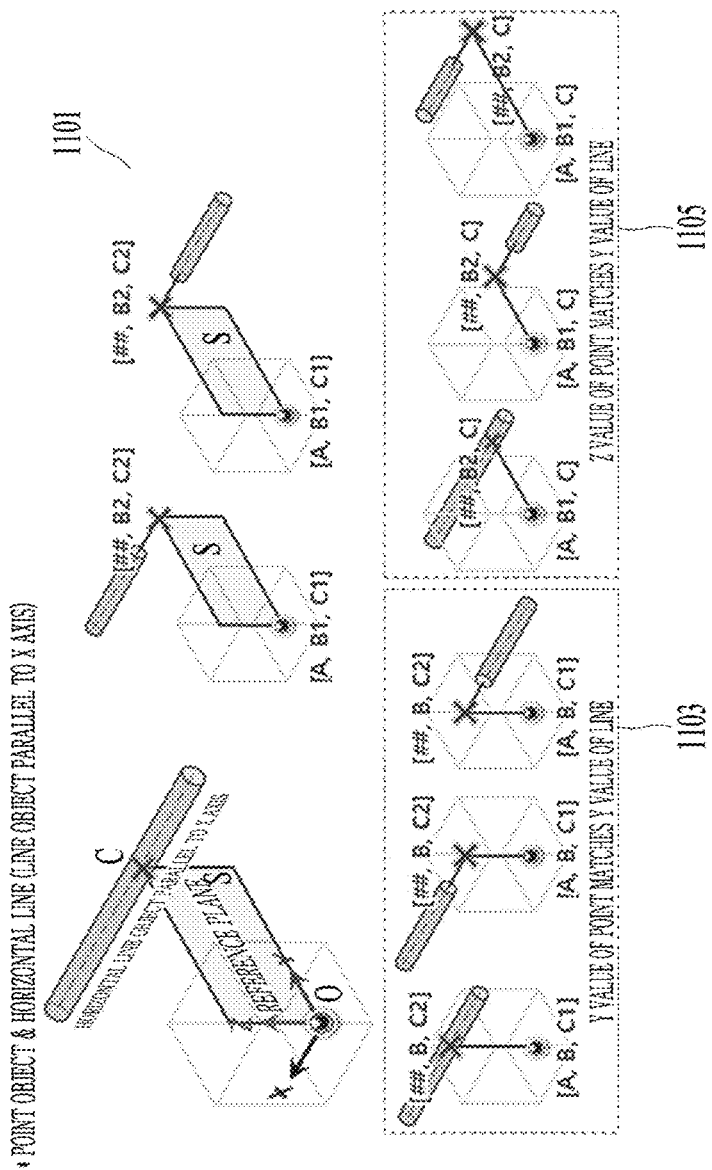

FIG. 11B is an exemplary view showing a distance between a line object 1101 and the point object based on various position relationships between the line object and the point object when the line object is the horizontal line object parallel to the x axis.

As described above, the control unit 190 may generate the reference plane S that passes orthogonally through the line object and passes through the origin point of the point object. However, the control unit 190 may not generate the reference plane S that passes orthogonally through the line object and passes through the origin point of the point object. In this case, the control unit 190 may generate the reference plane S that passes orthogonally through an extension line object extending in the line object direction and passes through the origin point of the point object.

As shown in FIG. 11B, point information of the line object and point information of the point object may be compared with each other, and their y axis values may match each other. In this case 1103, a distance between the line object and the point object may be a distance at which a difference between the coordinates is generated. That is, when the y axis values match each other, the distance between the line object and the point object may be C2-C1.

The point information of the line object and the point information of the point object may be compared with each other, and their z axis values may match each other. In this case 1105, the distance between the line object and the point object may be the distance at which the difference between the coordinates is generated. That is, when the z axis values match each other, the distance between the line object and the point object may be B2-B1.

Figure 11C:
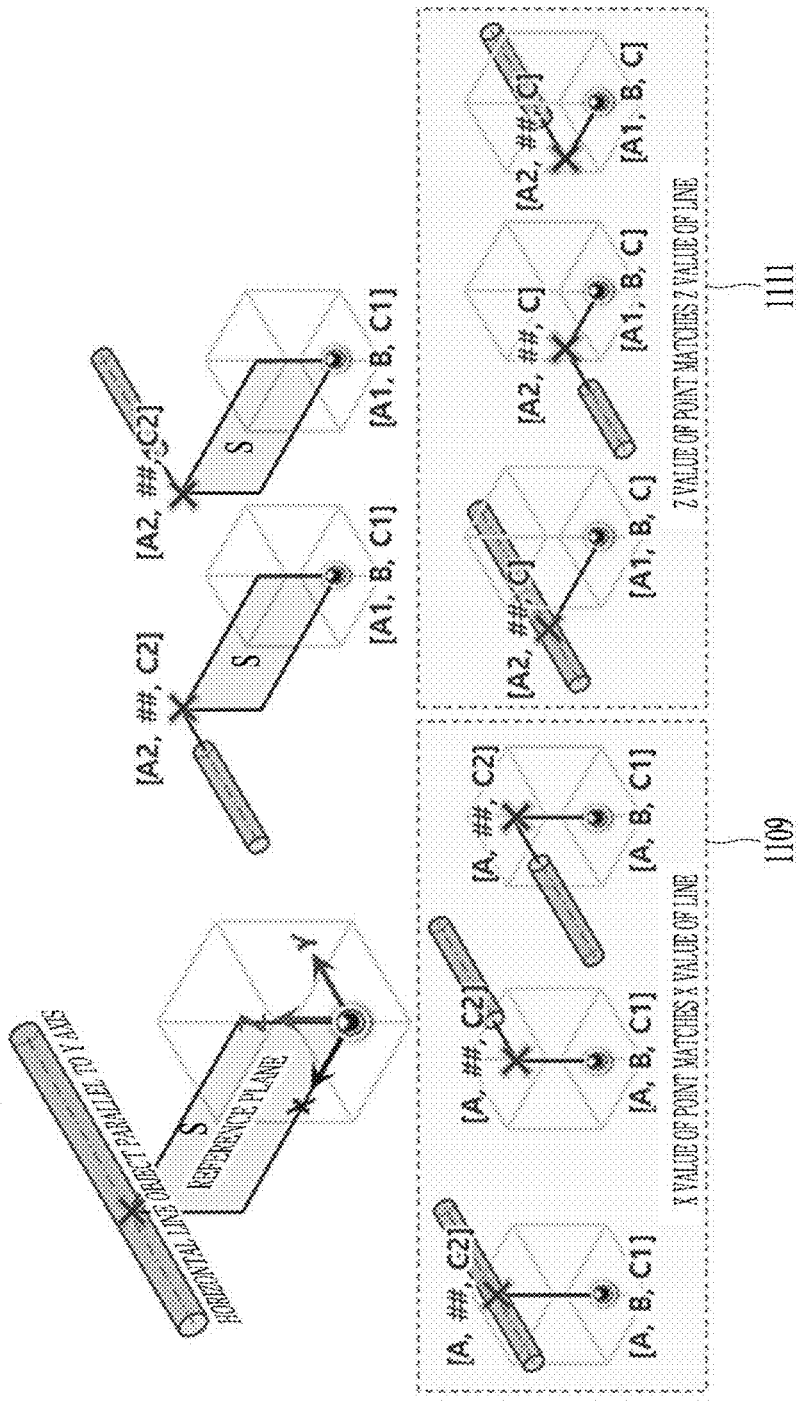

FIG. 11C is an exemplary view showing the distance between the line object and the point object based on various position relationships between the line object and the point object when the reference 3D model object is the horizontal line object parallel to the y axis.

As described above, the control unit 190 may generate the reference plane S that passes orthogonally through the line object and passes through the origin point of the point object. However, the control unit 190 may not generate the reference plane S that passes orthogonally through the line object and passes through the origin point of the point object. In this case 1107, the control unit 190 may generate the reference plane S that passes orthogonally through the extension line object generated by extending the line object in the line object direction and passes through the origin point of the point object.

As shown in FIG. 11C, the point information of the line object and the point information of the point object may be compared with each other, and their x axis values may match each other. In this case 1109, the distance between the line object and the point object may be the distance at which the difference between the coordinates is generated. That is, when the x axis values match each other, the distance between the line object and the point object may be C2-C1.

As shown in FIG. 11C, the point information of the line object and the point information of the point object may be compared with each other, and their z axis values may match each other. In this case 1111, the distance between the line object and the point object may be the distance at which the difference between the coordinates is generated. That is, when the z axis values match each other, the distance between the line object and the point object may be A1-A2.

Figure 12A:
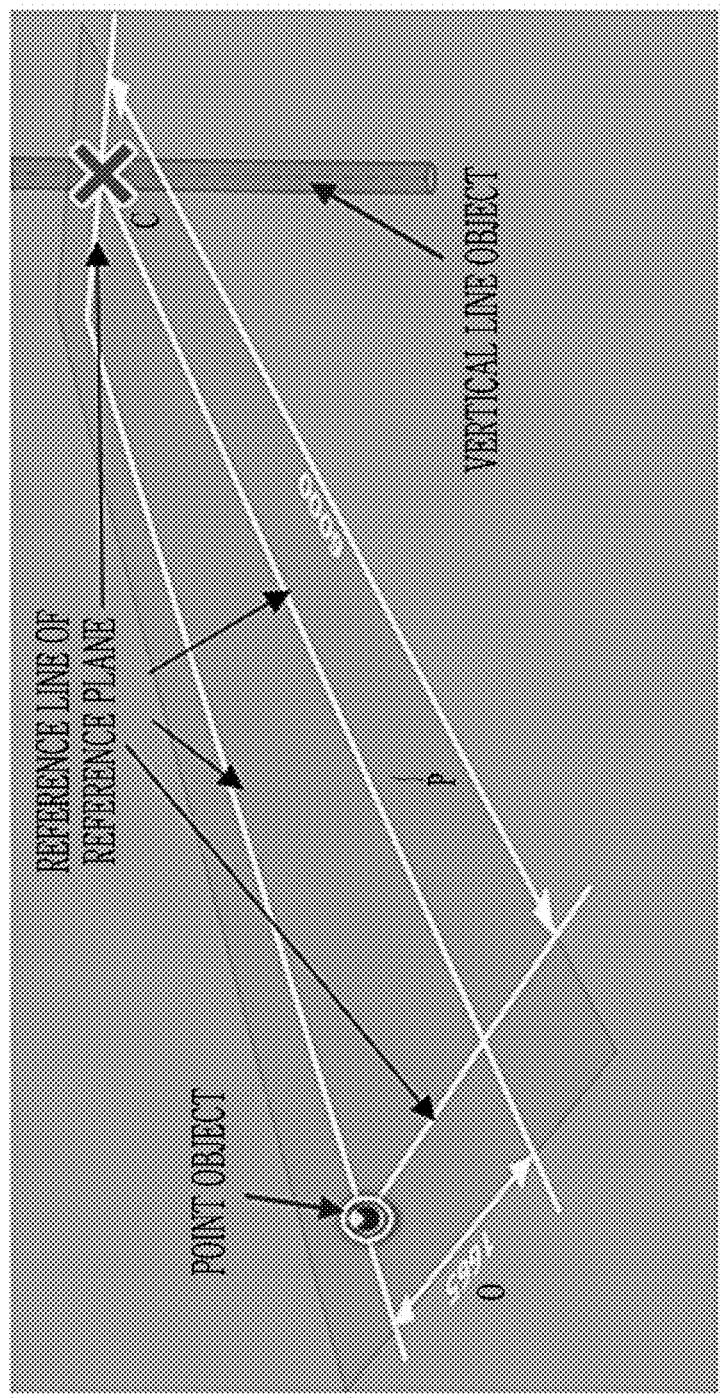
FIGS. 12a and 12b are exemplary views each showing a position where a distance is displayed when one of the adjacent 3D model objects is the point object and the other is the vertical line object.
Figure 12B:
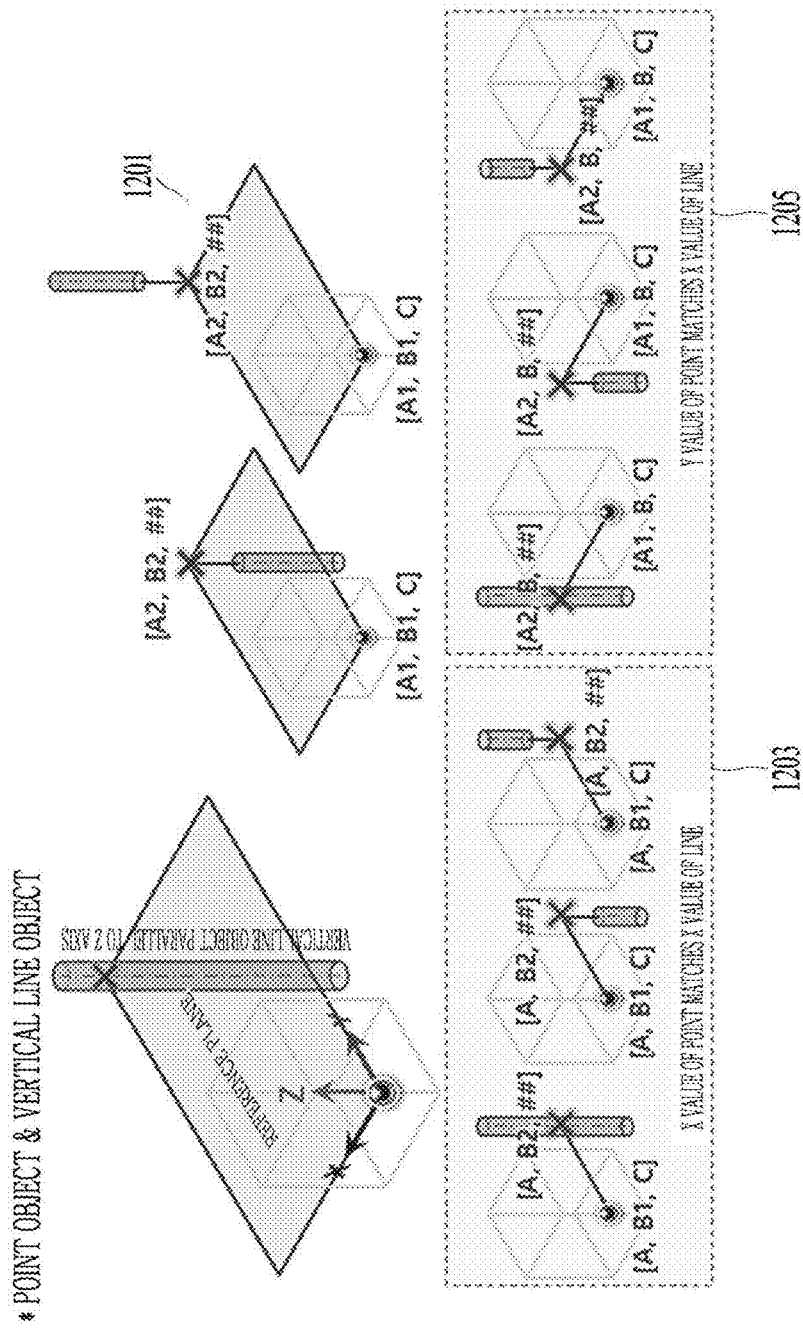

FIGS. 12A and 12B are views each showing the position where the distance is displayed when one of the adjacent 3D model objects is the point object and the other is the vertical line object.

The control unit 190 can determine that one of the adjacent 3D model objects is the line object and the other is the point object. The control unit 190 can collect the line direction information of the line object based on the 3D model data of the line object, and determine the position relationship, that is, to which axis the line object is parallel based thereon. Here, the control unit 190 can determine whether the line object is the horizontal line object parallel to the x axis and the y axis, or the vertical line object parallel to the z axis. The description describes this configuration in detail below with reference to FIGS. 12B and 12C.

Next, the control unit 190 can generate a reference plane P that is orthogonal to the line object and passes through the point O of the point object. In addition, the control unit 190 can calculate a distance between the point C of the line object where the reference plane P and the line object meet each other and the point O of the point object.

The control unit 190 can determine the position where the calculated distance is displayed based on the reference plane, the position relationship between the line object and the point object, and the line direction of the line object.

FIG. 12B is an exemplary view showing the distance between the line object and the point object based on various position relationships between the line object and the point object when the line object is the vertical line object parallel to the z axis.

As described above, the control unit 190 may generate the reference plane P that passes orthogonally through the line object and passes through the origin point of the point object. However, the control unit 190 may not generate the reference plane P that passes orthogonally through the line object and passes through the origin point of the point object. In this case, the control unit 190 may generate the reference plane P that passes orthogonally through the extension line object extending in the line object direction and passes through the origin point of the point object.

As shown in FIG. 12B, the point information of the line object and the point information of the point object may be compared with each other, and their x axis values may match each other. In this case 1203, the distance between the line object and the point object may be the distance at which the difference between the coordinates is generated. That is, when the x axis values match each other, the distance between the line object and the point object may be B2-B1.

As shown in FIG. 12B, the point information of the line object and the point information of the point object may be compared with each other, and their y axis values may match each other. In this case 1205, the distance between the line object and the point object may be the distance at which the difference between the coordinates is generated. That is, when the y axis values match each other, the distance between the line object and the point object may be A1-A2.

Figure 13A:
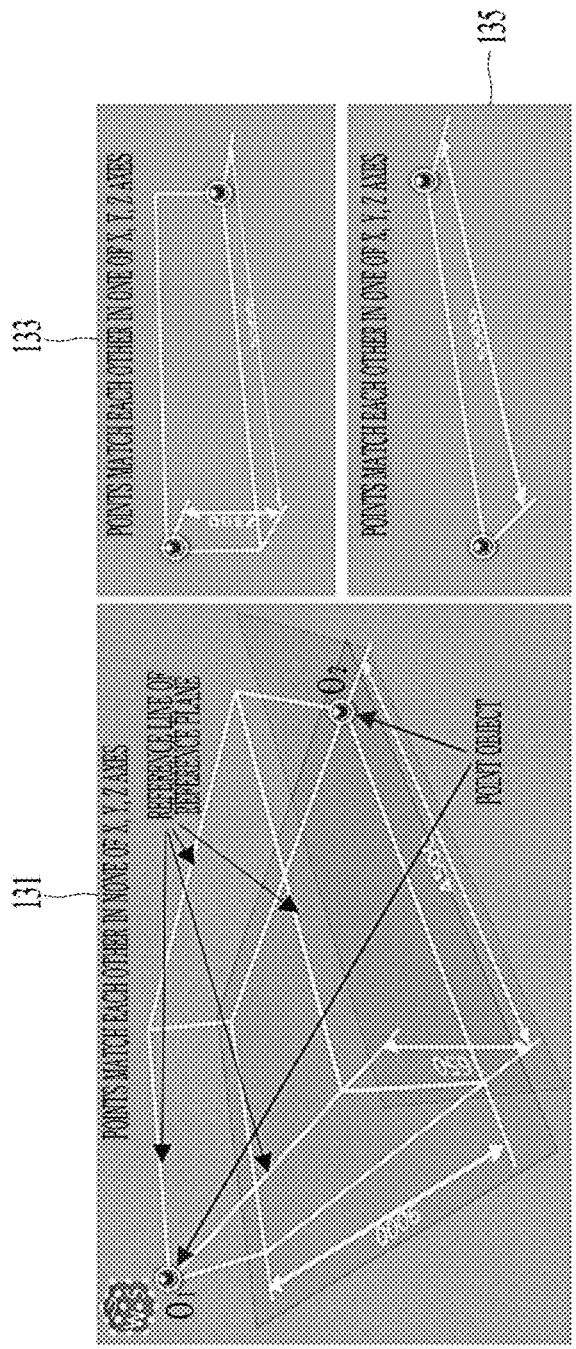
FIGS. 13A and 13B are views each showing a position where the calculated distance is displayed when all the adjacent 3D model objects are the point objects.
Figure 13B:
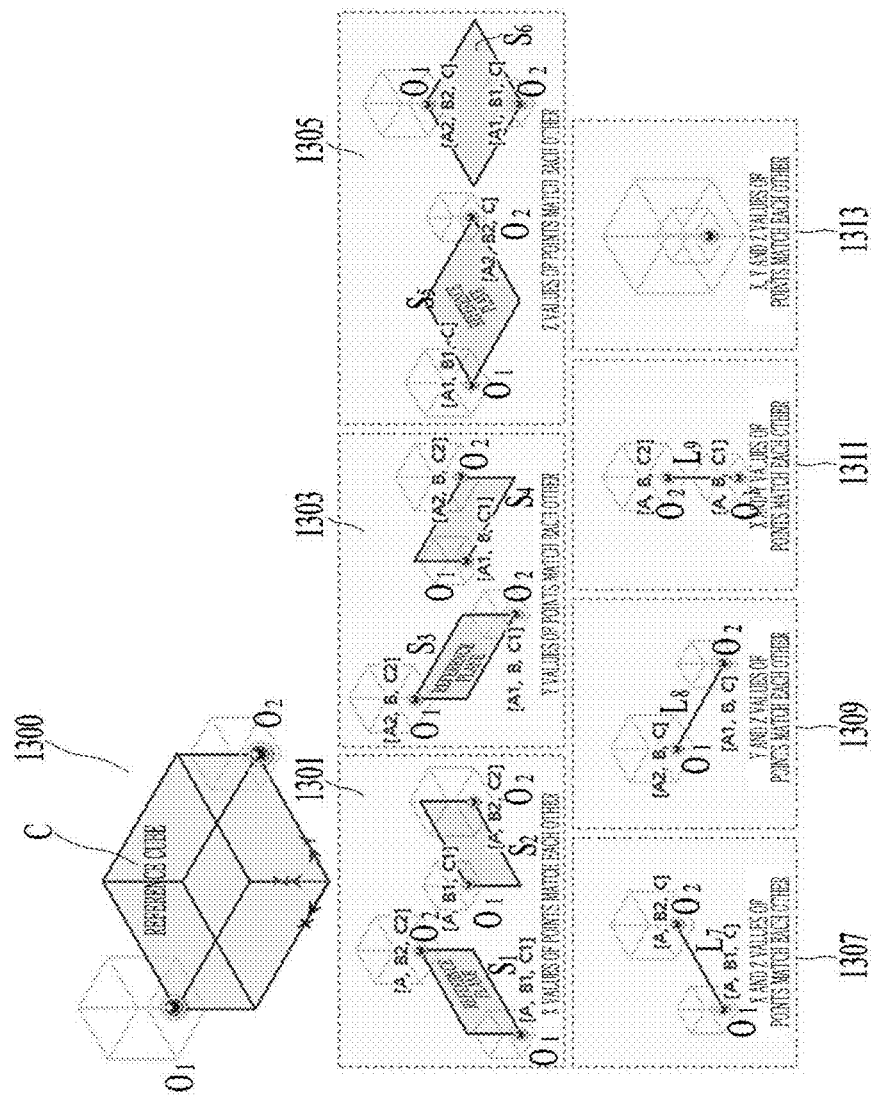

FIGS. 13A and 13B are views each showing the position where the distance is displayed when all the adjacent 3D model objects are the point objects.

FIG. 13A is a view schematically showing the distance between the objects based on relative positions of the points of the adjacent 3D model objects.

The control unit 190 can determine all the adjacent 3D model objects as the point objects. The control unit 190 may collect the point type and the point coordinate information based on the 3D model data of each of the 3D model objects. The control unit 190 can then calculate a distance difference between the respective point coordinate information.

The control unit 190 can compare the respective point coordinate information with each other to determine whether their axes match each other. The control unit 190 can generate a corresponding reference graphic and display the calculated distance along with the generated reference graphic based on whether the axes match each other. Here, the reference graphic may include a reference cube, the reference plane, or the reference line.

For example, as shown in 13A, the x axis, y axis, and z axis coordinate values of a point O1 of the reference 3D model object and those of a point O2 of the target 3D model object may all be different from each other. In this case 131, the control unit 190 may generate the reference cube and display the calculated distance along with the reference cube.

One of the x axis, y axis, and the z axis coordinate values of the point O1 of the reference 3D model object and that of the point O2 of the target 3D model object may match each other. In this case 133, the control unit 190 may generate the reference plane and display the calculated distance along with the reference plane.

Two of the coordinate values of the point O1 of the reference 3D model object and those of the point O2 of the target 3D model object may respectively match each other. In this case 135, the control unit 190 may generate the reference line and display the calculated distance along with the reference line.

FIG. 13B is a view showing positions where the distance based on the relative positions of the respective points of the adjacent 3D model objects and the reference graphic are displayed.

Assume that one point among the adjacent 3D model objects is O1 and the other point is O2. Here, O1 and O2 may be each origin point of the point objects.

A screen 1300 may be a screen displaying a reference cube C generated by the control unit 190 when the x axis, y axis, and z axis values of the point O1 and those of the point O2 are all different from each other. Here, the control unit 190 can calculate a distance between the point O1 and the point O2 and display the calculated distance along with the reference cube C.

Screens 1301, 1303, and 1305 may be screens respectively displaying reference planes S1, S2, S3, S4, S5, and S6 when one axis of the point O1 and that of the point O2 match each other. Here, the control unit 190 can calculate the distance between the point O1 and the point O2 and display the calculated distance along with the reference planes S1, S2, S3, S4, S5, and S6.

Screens 1307, 1309, and 1311 may be screens respectively displaying reference lines L7, L8, and L9 generated by the control unit 190 when two axes of the point O1 and those of the point O2 match each other. Here, the control unit 190 can calculate the distance between the point O1 and the point O2 and display the calculated distance along with the reference lines L7, L8, and L9.

A screen 1313 may be a screen displaying a case where the point O1 and the point O2 are the same as each other.

Figure 14:
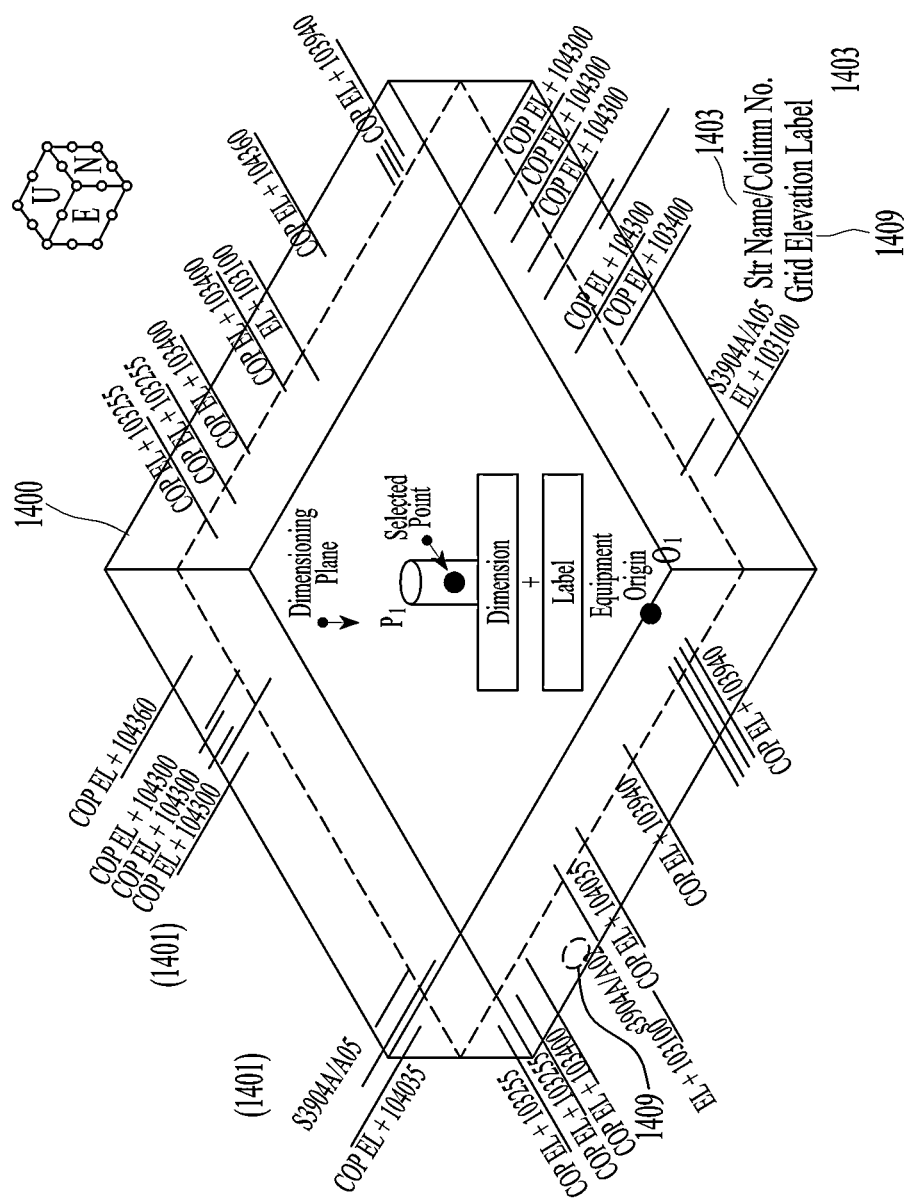
FIG. 14 is a view showing a position where a label of the 3D model object disposed in a category and a distance between the 3D model objects are displayed when the user inputs the arbitrary category.

FIG. 14 is a view showing a position where property information of the arbitrary 3D model objects, specified based on the rule, and the distance between the 3D model objects are displayed among the 3D model objects disposed in the category when the user inputs the arbitrary category.

The control unit 190 may receive an arbitrary category 1400 requiring user check through the input unit 130. Alternatively, the control unit 190 may receive a category having a pre-specified size based on the input reference coordinate information. Here, for convenience, the arbitrary category selected by the user may be referred to as a cube, and displayed by a reference line 1401 of the reference cube. The control unit 190 may clip only the necessary 3D model objects in the category, and hide the 3D model objects disposed outside the selected cube. For example, as shown in FIG. 14, only the points P1 and O1 of some 3D model objects among the 3D model objects disposed in the cube may be displayed, and the external 3D model object which is not disposed in the category 1400 may not be displayed. In this way, the control unit 190 can display additional detailed information, such as the distance between the objects and object information, while securing sufficient visibility.

The control unit 190 can determine the 3D model objects disposed in the arbitrary category.

For example, when the 3D model object is the point object, the control unit 190 may collect the point type and the point coordinate information based on the 3D model data, and determine that the 3D model object is disposed in the cube when the x and y coordinates of the point are included in the cube. In detail, the control unit 190 can determine that the 3D model object is disposed in the cube when the x axis and y axis values of its point coordinates are included in the cube even if the z axis value is not included in the cube. However, the control unit 190 may not determine that the 3D model object is disposed in the arbitrary category when the x axis and y axis values of its point coordinates are not included in the cube.

The control unit 190 can then collect the coordinate information where a point extension line of the point coordinate and a category slope, that is, the cube, are orthogonal to each other.

In addition, when the 3D model object is the line object, the control unit 190 may collect the line direction information and information on the start and end points of the line object based on the 3D model data, and determine that the 3D model object is disposed in the cube when the coordinates of the start point and end point are included in the cube.

The control unit 190 may collect line information where the line object and the category slope are orthogonal to each other.

Next, the control unit 190 can display the label of each of the 3D model objects included in the category at a position corresponding to each model object. Here, the corresponding position may be a point where the leader line extending from an end of the 3D model object and the category slope meet each other, and may be a point disposed on the outskirt of the cube. For example, a screen 1400 may display an architectural structure name/pillar number 1403, height information 1405 of an architectural grid associated with the architectural structural member, height information 1407 of the pipe, or the like at the corresponding positions.

In addition, the control unit 190 can calculate the distance between the adjacent 3D model objects and display the same at the corresponding position. Here, the corresponding position may be a position corresponding to the coordinate information where the point extension line and the category slope are orthogonal to each other and/or the line information where the line object and the category slope are orthogonal to each other. For example, the screen 1400 may display a position 1409 corresponding to the distance between the objects.

That is, the control unit 190 can display a necessary label of the 3D model objects disposed in the category along with the corresponding information by connecting the leader line to the end of the corresponding 3D model object. In addition, the control unit 190 can calculate the distance between the adjacent 3D model objects among the 3D model objects disposed in the category and display the same in a coordinate order on the outskirt of the cube.

Figure 15:
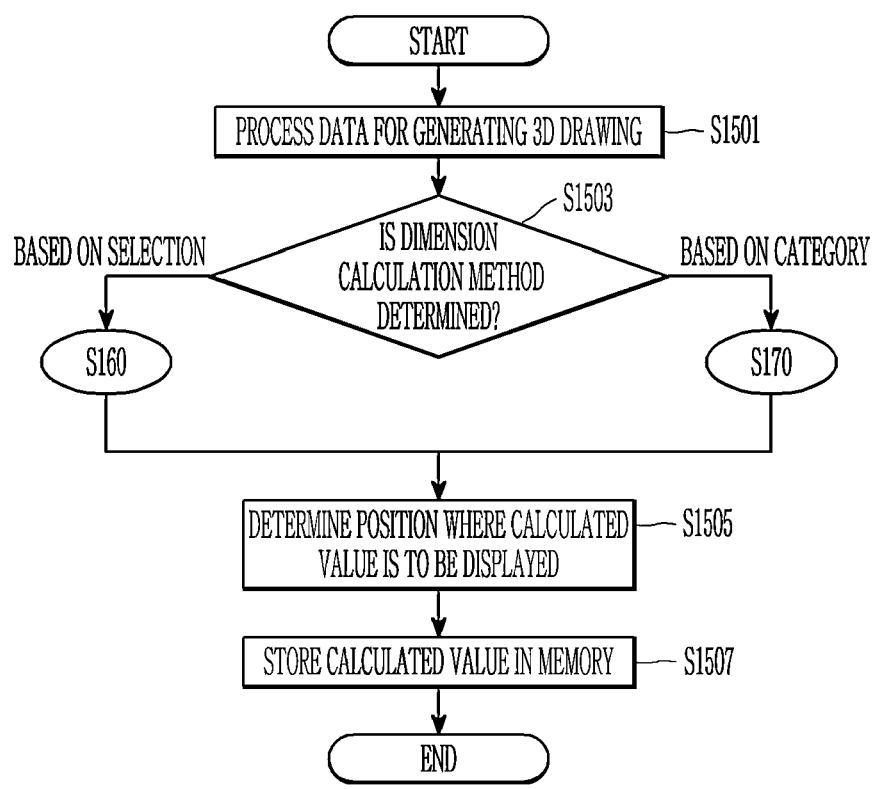
FIG. 15 is a flowchart schematically describing an operation of a 3D model device according to an embodiment of the disclosure.

FIG. 15 is a flowchart schematically describing an operation of a three-dimensional (3D) model device 10 according to another embodiment of the disclosure.

First, a control unit 190 may processes data for generating a 3D drawing (S1501).

In detail, the control unit 190 can process the data for generating the 3D drawing based on 3D model data pre-stored in a memory 170.

The 3D drawing can include a plurality of 3D model objects.

The control unit 190 can check user input to an input unit 130 to determine a dimension calculation method (S1503).

In detail, the control unit 190 can determine the dimension calculation method based on a dimension calculation method selected by a user that is input to the input unit 130. For example, the user can select whether to calculate a dimension of the 3D model object based on user selection or a category.

The control unit 190 may then perform an operation S160 when the dimension calculation method is based on the selection, and perform an operation S170 when the dimension calculation method is based on the category.

The control unit 190 may determine a position where the calculated value is to be displayed after performing the operation S160 or the operation S170 (S1505).

The control unit 190 can determine the position where the calculated value is to be displayed based a rule for determining the position where the calculated value is displayed.

The control unit 190 may store the calculated value in the memory 170 (S1507).

In detail, when the user determines that the calculated value needs to be checked later, the control unit 190 may store the calculated value in the operation S160 or the operation S170 in the memory 170. The control unit 190 may transmit the value stored in the memory 170 to another device through a communication unit 110.

Figure 16:
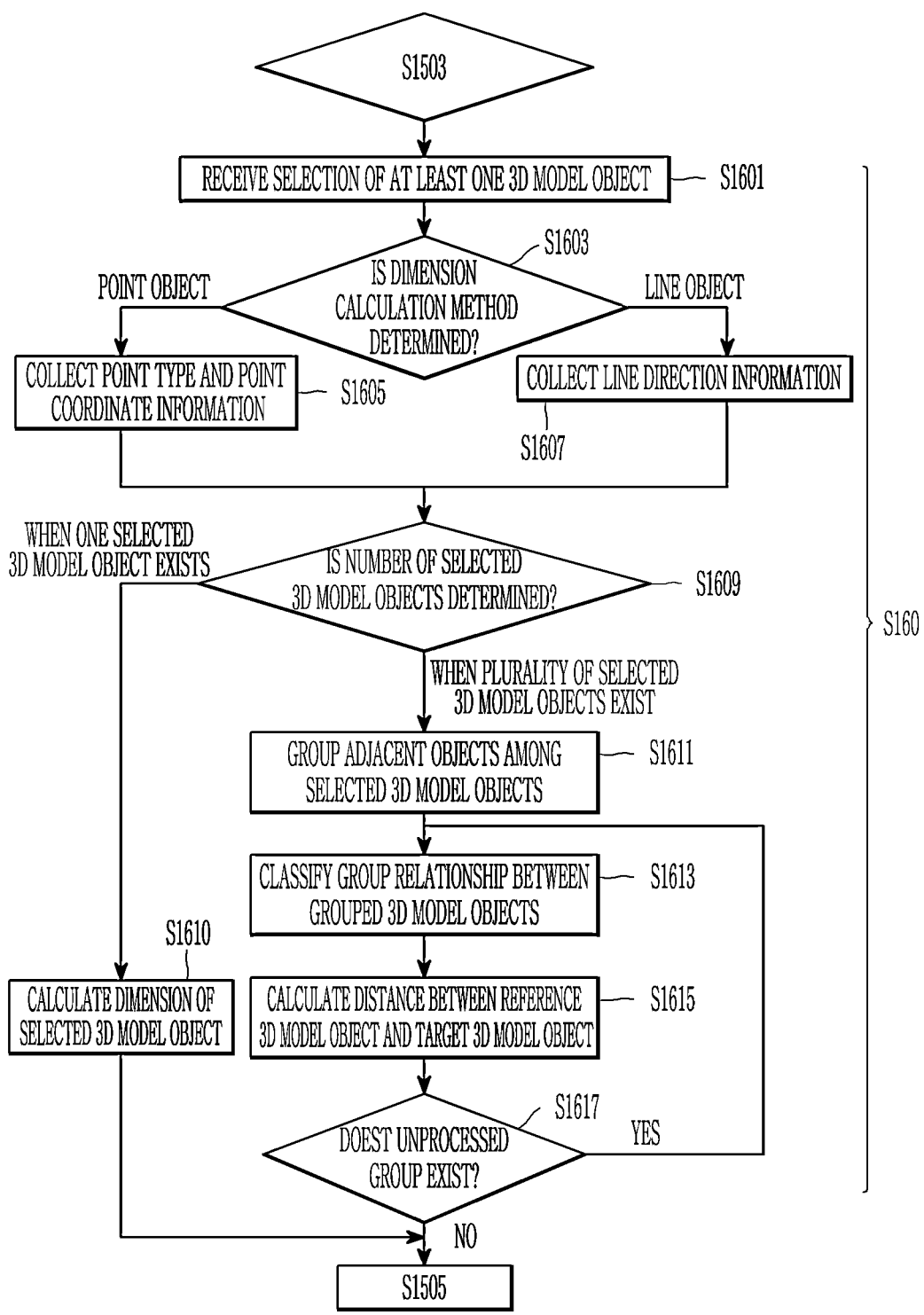
FIG. 16 is a flow chart specifically showing operation S160.

FIG. 16 is a flow chart specifically showing the operation S160.

The control unit 190 may receive selection of at least one 3D model object that is input through the input unit 130 (S1601).

Next, the control unit 190 may determine a type of at least one selected 3D model object (S1603).

In detail, the control unit 190 can determine the type of the 3D model object based on the 3D model data corresponding to each 3D model object that is stored in the memory 170. Here, the 3D model data may include information on the type of the 3D model object, a point determination rule for determining a point of each object, a 3D model object property, an operation condition, or the like.

The control unit 190 may then collect a point type and point coordinate information when the selected 3D model object is a point object (S1605).

The control unit 190 may collect line direction information when the selected 3D model object is a line object (S1607).

Next, the control unit 190 may determine the number of selected 3D model objects (S1609).

The control unit 190 may calculate a dimension of the selected 3D model object when only one selected 3D model object exists (S1610).

The control unit 190 may then determine a position where the calculated dimension is to be displayed (S1505).

Meanwhile, the control unit 190 may group the adjacent objects among the selected 3D model objects when the plurality of selected 3D model objects exist (S1611).

The control unit 190 may classify a group relationship between the grouped 3D model objects (S1613).

In detail, the control unit 190 can determine one of the selected 3D model objects as a reference 3D model object and determine the other as a target 3D model object. The control unit 190 can classify the group relationship based on each object type of the reference 3D model object and the target 3D model object determined in the operation S1603. In the group relationship, all the reference 3D model object and the target 3D model object may be the line objects, all the reference 3D model object and the target 3D model object may be the point objects, or one of the reference 3D model object and the target 3D model object may be the line object and the other may be the point object.

The control unit 190 may then calculate a distance between the reference 3D model object and the target 3D model object based on the group relationship between the classified 3D model objects (S1615).

When an unprocessed group exists (S1617), the control unit 190 may re-perform the operation S1613 to classify the group relationship between the 3D model objects.

When the unprocessed group does not exist (S1617), the control unit 190 may determine a position where the calculated distance between the 3D model objects is to be displayed (S1505).

Figure 17:
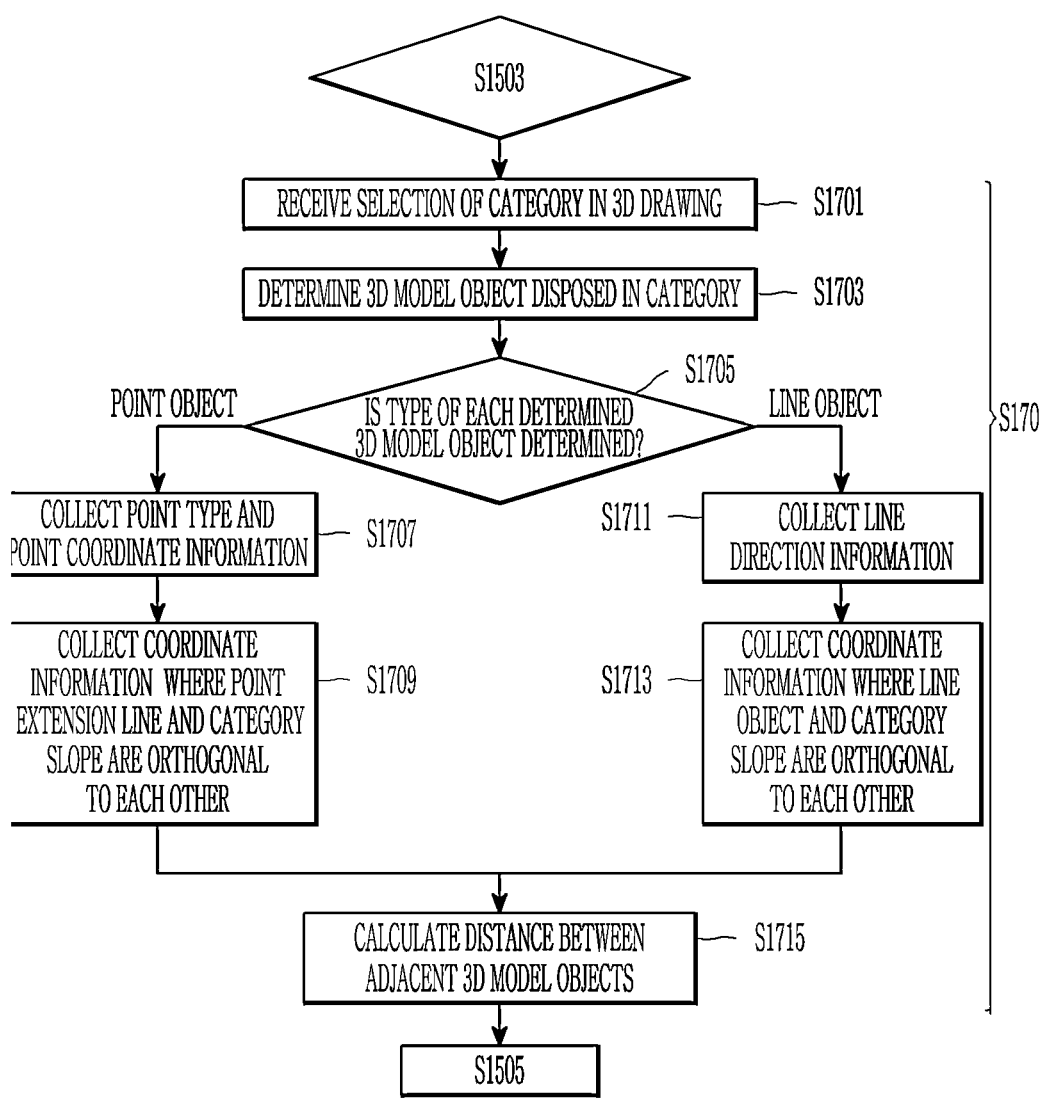
FIG. 17 is a flow chart specifically showing operation S170.

FIG. 17 is a flow chart specifically showing the operation S170.

The control unit 190 may receive selection of the category in the 3D drawing that is input through the input unit 130 (S1701).

The control unit 190 may receive an arbitrary category requiring user check through the input unit 130. There may be a method for the user to input coordinates of a point disposed on each edge of the category or to input a category size. In detail, the method for the user to input the arbitrary category through the input unit 130 may include a method for the user to specify the category through a clipping function on a 3D viewer, to input the maximum and minimum x axis, y axis, z axis coordinate values of the required category, or to directly input the category size after specifying the reference object. Alternatively, the control unit 190 may receive coordinate information based on a position selected by the user through the input unit 130, and may also receive the category having a pre-specified size based on the coordinate information based on this position.

The control unit 190 may determine the 3D model object disposed in the category (S1703).

Next, the control unit 190 may determine the type of each determined 3D model object (S1705).

In detail, the control unit 190 can determine the type of the 3D model object based on the 3D model data corresponding to each 3D model object that is stored in the memory 170.

The control unit 190 may then collect the point type and the point coordinate information when the 3D model object is the point object (S1707). In addition, the control unit 190 may collect the coordinate information where a point extension line and a category slope are orthogonal to each other (S1709).

The control unit 190 may collect the line direction information when the selected 3D model object is the line object (S1711). In addition, the control unit 190 may collect the line information where the line object and the category slope are orthogonal to each other (S1713).

Next, the control unit 190 may calculate a distance between the adjacent 3D model objects among the 3D model objects disposed in the category (S1715).

The control unit 190 may determine the position where the calculated distance between the 3D model objects is to be displayed (S1505).

The 3D model device 10 according to an embodiment of the disclosure may accurately calculate the distance between the 3D objects or the dimension of the 3D object. In addition, the 3D model device 10 can directly calculate the distance between the 3D objects or the dimension of the 3D object. Therefore, the 3D model device 10 can calculate the dimension or distance of a necessary part even when the distance between the 3D objects or the dimension of the 3D object is not pre-stored.

In addition, the 3D model device 10 according to an embodiment of the disclosure may display the necessary information, such as the calculated dimension or distance, at the appropriate position, thereby improving the visibility of the 3D drawing.

Further, the 3D model device 10 according to an embodiment of the disclosure may select the arbitrary category in the 3D drawing and sequentially display the information on the object disposed in the category on the outskirt of the category, thereby replacing the existing 2D drawing.

In addition, the 3D model device 10 according to an embodiment of the disclosure may store the data on the dimension of the 3D model object that is checked by the user, the distance between the 3D model objects, the type of the 3D model object, the size, position, or the like of the selected arbitrary category, and then generate and utilize the same 3D drawing by using the stored data.

The 3D model device 10 according to an embodiment of the disclosure may store the calculated dimension of the 3D model object in the memory 170 and the distance between the 3D model objects in the memory 170. Therefore, if necessary, the 3D model device 10 may then transmit the value which can be checked from the memory 170 and stored in the memory 170 to another 3D model device 10 or another server. The 3D model device 10 may thus smoothly perform communication with another user who shares the same 3D drawing, and variously use the 3D drawing, such as sharing a check item in real time or checking information checked by a designer.

The embodiments described above may be implemented in the form of a computer program that can be executed through various components on a computer, and such a computer program may be recorded on a computer-readable medium. Here, the medium may include a magnetic medium such as a hard disk, a floppy disk, or a magnetic tape, an optical recording medium such as a compact disk read only memory (CD-ROM) or a digital versatile disk (DVD), a magneto-optical medium such as a floptical disk, and a hardware device specifically configured to store and execute a program instruction, such as a read only memory (ROM), a random access memory (RAM), or the flash memory 170.

The operations may be performed in an appropriate order unless there is an explicit order or description to the contrary regarding the operations configuring the method according to another embodiment. The disclosure is not necessarily limited by the order of the operations described above. The use of any examples or exemplary terms (for example, or the like) in the disclosure is intended only to describe the disclosure in detail, and does not limit the scope of the disclosure. In addition, those skilled in the art would appreciate that various modifications, combinations, and changes can be made within the scope of the patent claims or their equivalents.

Although the embodiments of the disclosure have been described in detail hereinabove, the scope of the disclosure is not limited thereto. Various modifications and improvements made by those skilled in the art to which the disclosure pertains also belong to the scope of the disclosure.

The invention claimed is:

1. A method for displaying a three-dimensional (3D) drawing including a plurality of 3D model objects by a computing device including a control unit, an input unit, a display device, and a memory, the method comprising:
    displaying, by the control unit, the 3D drawing including the plurality of 3D model objects in the display device;
    receiving, by the input unit, selection of a first 3D model object in the 3D drawing including the plurality of 3D model objects;
    calculating, by the control unit, a dimension of the first 3D model object based on 3D model data corresponding to the first 3D model object;
    storing, by the control unit, the dimension of the first 3D model object in the memory;
    receiving, by the input unit, selection of two or more second 3D model objects in the 3D drawing;
    grouping, by the control unit, two second 3D model objects disposed to be adjacent to each other among the two or more second 3D model objects into grouped 3D model objects;
    classifying, by the control unit, a group relationship between the grouped 3D model objects based on connection relationship information between the grouped 3D model objects in the 3D drawing, wherein the group relationship is selected from among a plurality of group relationships including a group relationship formed by a point object and a line object, a group relationship formed by two point objects, and a group relationship formed by two line objects;
    calculating, by the control unit, a distance between the grouped 3D model objects based on the 3D model data, based on the group relationship;
    storing, by the control unit, the distance in the memory;
    determining, by the control unit, a position on the 3D drawing where at least one of the dimension and the distance is displayed based on a display position determination rule, wherein the display position determination rule for determining the position where the dimension is displayed is based on a user viewpoint direction, and the display position determination rule for determining the position where the distance is displayed is based on types of the grouped 3D model objects and the group relationship between the grouped 3D model objects; and
    displaying, by the control unit, the at least one of the dimension and the distance on the position of the 3D drawing in the display device,
    wherein the 3D model data includes object type information of the 3D model object that corresponds to each 3D model object, and the connection relationship information.

2. The method of claim 1, further comprising:
    determining, by the control unit, a type of a second 3D object model of the second 3D model objects based on the object type information after receiving, by the input unit, the selection of the two or more second 3D model objects, the type of the second 3D model object including the point object or the line object;
    collecting, by the control unit, a point type and point coordinate information of the second 3D model object based on the corresponding 3D model data when the second 3D model object is the point object; and collecting, by the control unit, line direction information of the second 3D model object based on the corresponding 3D model data when the second 3D model object is the line object.

3. The method of claim 2, wherein
the calculating of the distance between the grouped 3D model objects includes:
calculating, by the control unit, a distance difference between the line objects in a direction orthogonal to a line based on the line direction information when in the group relationship, the grouped 3D model objects are the line objects;
calculating, by the control unit, a distance difference between the point coordinate information and the line object in the direction orthogonal to the line when one of the grouped 3D model objects is the point object and the other is the line object; and
calculating, by the control unit, at least one of an x axis distance, a y axis distance, a z axis distance, and a shortest distance between the respective point coordinate information when the grouped 3D model objects grouped into the one group are the point objects.

4. The method of claim 3, wherein
the display position determination rule for determining the position where the distance is displayed is further based on the user viewpoint direction.

5. The method of claim 3, wherein
the determining, by the control unit, of the position where the at least one of the dimension and the distance is displayed based on the display position determination rule includes:
displaying, by the control unit, the distance on a plane where a largest area is visible based on the user viewpoint direction relative to an z axis when the grouped 3D model objects are vertical line objects parallel to the z axis; and
displaying, by the control unit, the distance in the user viewpoint direction when the grouped 3D model objects are horizontal line objects parallel to an x axis and a y axis.

6. The method of claim 3, wherein
the determining, by the control unit, of the position where the at least one of the dimension and the distance is displayed based on the display position determination rule includes
generating, by the control unit, a reference plane that is orthogonal to the line object and passes through a point coordinate of the point object when one of the grouped 3D model objects is the point object and the other is the line object, and
the display position determination rule is based more on the reference plane and a line direction of the line object.

7. The method of claim 4, wherein
the determining, by the control unit, of the position where the at least one of the dimension and the distance is displayed based on the display position determination rule includes:
determining, by the control unit, whether the grouped 3D model objects have their axes at least one of the x-axis, y-axis, and z-axis matching each other based on the point coordinate information of each of the grouped 3D model objects when the grouped 3D model objects are the point objects;
generating, by the control unit, a reference graphic including at least one of a reference cube, a reference plane, and a reference line based on whether the axes match each other; and
displaying, by the control unit, the calculated distance along with the generated reference graphic.

8. A method for displaying a three-dimensional (3D) drawing by a computing device including a control unit, an input unit, a display device, and a memory, the method comprising:
displaying, by the control unit, the 3D drawing including a plurality of 3D model objects in the display device;
receiving, by the input unit, selection of an arbitrary category in the 3D drawing including plurality of 3D model objects;
determining, by a control unit, two or more 3D model object disposed in the arbitrary category;
grouping, by the control unit, two 3D model objects disposed to be adjacent to each other among the two or more 3D model objects into grouped 3D model objects;
classifying, by the control unit, a group relationship between the grouped 3D model objects based on connection relationship information between the 3D model objects in the 3D drawing, wherein the group relationship is selected from among a plurality of group relationships including a group relationship formed by a point object and a line object, a group relationship formed by two point objects, and a group relationship formed by two line objects;
calculating, by the control unit, a distance between the grouped 3D model objects based on 3D model data including the connection relationship information and object type information of the grouped 3D model object, based on the group relationship;
storing the distance in the memory;
determining, by the control unit, a position on the 3D drawing where the distance is displayed based on a display position determination rule, wherein the display position determination rule is based on types of the grouped 3D model objects and the group relationship between the grouped 3D model objects; and
displaying, by the control unit, the distance on the position of the 3D drawing in the display device.

9. The method of claim 8, wherein
the determining, by the control unit, of the two or more 3D model objects disposed in the arbitrary category includes:
determining, by the control unit, a type of a 3D model object of the two or more 3D model objects based on the object type information, the type of the 3D model object including the point object or the line object;
collecting, by the control unit, a point type and point coordinate information of the 3D model object based on the corresponding 3D model data when the 3D model object is the point object; determining, by the control unit, the 3D model object as being disposed in the arbitrary category when its x axis and y axis coordinate values in the point coordinate information are disposed in the arbitrary category;
collecting, by the control unit, a start point, an end point, and the line direction information of the 3D model object based on the corresponding 3D model data when the 3D model object is the line object; and determining, by the control unit, the 3D model object as being disposed in the arbitrary category when coordinates of the start and end points of the line object are disposed in the arbitrary category.

10. The method of claim 9, wherein
the calculating of the distance between the grouped 3D model objects includes:
calculating, by the control unit, a distance difference between the line objects in a direction orthogonal to a line based on the line direction information when in the group relationship, the grouped 3D model objects are the line objects;
calculating, by the control unit, a distance difference between the point coordinate information and the line object in the direction orthogonal to the line when one of the grouped 3D model objects is the point object and the other is the line object; and
calculating, by the control unit, at least one of an x axis distance, a y axis distance, a z axis distance, and a shortest distance between the respective point coordinate information when the grouped 3D model objects are the point objects.

11. The method of claim 10, further comprising:
collecting, by the control unit, the coordinate information where a point extension line of each 3D model object in an x axis direction or a y axis direction and an arbitrary category slope are orthogonal to each other based on the point coordinate information when the 3D model object is the point object;
collecting, by the control unit, line information where the line object and the category slope are orthogonal to each other when the 3D model object is the line object; and
displaying, by the control unit, the distance between the grouped 3D model objects in the collected coordinate information.

12. An device for displaying a three-dimensional (3D) drawing, the device comprising:
a display device;
an input unit configured to receive selection of two or more 3D model objects in the 3D drawing including the plurality of 3D model objects;
a control unit configured to:
display the 3D drawing including the plurality of 3D model objects in the display device,
calculate a dimension of a first 3D model object of the two or more 3D model objects based on 3D model data corresponding to the first 3D model object,
group two second 3D model objects disposed to be adjacent to each other among the two or more 3D model objects into grouped 3D model objects,
classify a group relationship between the grouped 3D model objects based on connection relationship information between the grouped 3D model objects in the 3D drawing, wherein the group relationship is selected from among a plurality of group relationships including a group relationship formed by a point object and a line object, a group relationship formed by two point objects, and a group relationship formed by two line objects,
calculate a distance between the grouped 3D model objects based on the 3D model data, based on the group relationship,
determine a position of the 3D drawing where at least one of the dimension and the distance is displayed based on a display position determination rule, wherein the display position determination rule for determining the position where the dimension is displayed is based on a user viewpoint direction, and the display position determination rule for determining the position where the distance is displayed is based on types of the grouped 3D model objects and the group relationship between the grouped 3D model objects, and
display the at least one of the dimension and the distance on the position of the 3D drawing in the display device; and
a memory configured to the dimension of the first 3D model object and the distance between the grouped 3D model objects,
wherein the 3D model data includes object type information of the 3D model object that corresponds to each 3D model object, and the connection relationship information, and
wherein the display position determination rule is based on at least one of a user viewpoint direction, a type of the selected 3D model object, and the group relationship between the grouped 3D model objects.

13. The device of claim 12, wherein
the control unit is configured to:
determine a type of a second 3D model object of the second 3D model objects based on the object type information after the input unit receives the selection of the two or more second 3D model objects, the type of the second 3D model object including the point object or the line object, and
collect a point type and point coordinate information of the second 3D model object based on the corresponding 3D model data when the second 3D model object is the point object, and collects line direction information of the second 3D model object based on the corresponding 3D model data when the second 3D model object is the line object.

14. The device of claim 13, wherein
the control unit is configured to:
calculate a distance difference between the line objects in a direction orthogonal to a line based on the line direction information when in the group relationship, the grouped 3D model objects are the line objects,
calculate a distance difference between the point coordinate information and the line object in the direction orthogonal to the line when one of the grouped 3D model objects is the point object and the other is the line object, and
calculate at least one of an x axis distance, a y axis distance, a z axis distance, and a shortest distance between the respective point coordinate information when the grouped 3D model objects are the point objects.

15. The device of claim 14, wherein
the display position determination rule for determining the position where the distance is displayed is further based on the user viewpoint direction.

16. The device of claim 14, wherein
the control unit is configured to:
display the distance on a plane where a largest area is visible based on the user viewpoint direction relative to an z axis when the grouped 3D model objects are vertical line objects parallel to the z axis, and
display the distance in the user viewpoint direction when the grouped 3D model objects are horizontal line objects parallel to an x axis and a y axis.

17. The device of claim 14, wherein
the control unit is configured to generate a reference plane that is orthogonal to the line object and passes through a point coordinate of the point object when one of the grouped 3D model objects is the point object and the other is the line object, and the display position determination rule is based more on the reference plane and a line direction of the line object.

18. The device of claim 14, wherein
the control unit is configured to:
  determine whether the grouped 3D model objects have their axes at least one of the x-axis, y-axis, and z-axis matching each other based on the point coordinate information of each of the grouped 3D model object when the grouped 3D model objects are the point objects,
  generate a reference graphic including at least one of a reference cube, a reference plane, and a reference line based on whether the axes match each other, and
  display the calculated distance along with the generated reference graphic.

19. An device for displaying a three-dimensional (3D) drawing, the device comprising:
  a display device;
  an input unit configured to receive selection of an arbitrary category in the 3D drawing including a plurality of 3D model objects;
  a control unit configured to:
    display the 3D drawing including a plurality of 3D model objects in the display device;
  determine two or more 3D model objects disposed in the arbitrary category,
    group two 3D model objects disposed to be adjacent to each other among the two or more 3D model objects into grouped 3D model objects,
    classify a group relationship between the grouped 3D model objects based on connection relationship information between the grouped 3D model objects in the 3D drawing, wherein the group relationship is selected from among a plurality of group relationships including a group relationship formed by a point object and a line object, a group relationship formed by two point objects, and a group relationship formed by two line objects,
    calculate a distance between the grouped 3D model objects based on 3D model data including object type information of the grouped 3D model objects and the connection relationship information, based on the group relationship, and
    determine a position on the 3D drawing where the distance is displayed based on a display position determination rule, wherein the display position determination rule is based on types of the grouped 3D model objects and the group relationship between the grouped 3D model objects, and
    display the distance on the position of the 3D drawing in the display device; and
  a memory configured to the distance between the grouped 3D model objects.

20. The device of claim 19, wherein
the control unit is configured to:
  determine a type of a 3D model of the grouped 3D model objects based on the object type information, the type of the 3D model object including the point object or the line object,
  collect a point type and point coordinate information of the 3D model object based on the corresponding 3D model data when the 3D model object is the point object,
  determine the 3D model object as being disposed in the arbitrary category when its x axis and y axis coordinate values in the point coordinate information are disposed in the arbitrary category,
  collect a start point, an end point, and line direction information of the 3D model object based on the corresponding 3D model data when the 3D model object is the line object, and
  determine the 3D model object as being disposed in the arbitrary category when coordinates of the start and end points of the line object are disposed in the arbitrary category.

21. The device of claim 20, wherein
the control unit is configured to:
  calculate a distance difference between the line objects in a direction orthogonal to a line based on the line direction information when in the group relationship, the grouped 3D model objects are the line objects,
  calculate a distance difference between the point coordinate information and the line object in the direction orthogonal to the line when one of the grouped 3D model objects is the point object and the other is the line object, and
  calculate at least one of an x axis distance, a y axis distance, a z axis distance, and a shortest distance between the respective point coordinate information when the grouped 3D model objects are the point objects.

22. The device of claim 21, wherein
the control unit is configured to:
  collect the coordinate information where a point extension line of the 3D model object in an x axis direction or a y axis direction and an arbitrary category slope are orthogonal to each other based on the point coordinate information when the 3D model object is the point object,
  collect line information where the line object and the category slope are orthogonal to each other when the 3D model object is the line object, and
  display the distance in the collected coordinate information.

23. A non-transitory computer-readable medium storing a program that, when executed by a processor, causes a processor to perform the method according to claim 1.

24. A non-transitory recording medium storing a program performing the method according to claim 1.

* * * * *